United States Patent
Molzahn et al.

[11] Patent Number: 6,103,280
[45] Date of Patent: Aug. 15, 2000

[54] SELF-COOLING CONTAINERS OF BEVERAGE AND FOODSTUFFS

[75] Inventors: Stuart W. Molzahn, Derbyshire; Gregory Berman, Cambridge; John Russell Tippetts, Sheffield; Lisa Jane Paine, Leicestershire; William Dando, Derbyshire, all of United Kingdom

[73] Assignee: Bass Public Limited Company, United Kingdom

[21] Appl. No.: 09/157,048

[22] Filed: Sep. 18, 1998

[30] Foreign Application Priority Data

Sep. 20, 1997 [GB] United Kingdom .................... 9720006
Sep. 20, 1997 [GB] United Kingdom .................... 9720009

[51] Int. Cl.⁷ ........................................... F25D 3/10
[52] U.S. Cl. .......................... 426/109; 426/112; 426/124; 62/4; 62/293; 62/294
[58] Field of Search ..................... 426/109, 112, 426/124, 131; 206/120, 222, 213.1, 217; 62/4, 293, 294

[56] References Cited

U.S. PATENT DOCUMENTS

| | | | |
|---|---|---|---|
| 3,326,013 | 6/1967 | Jacob | 426/109 |
| 3,874,557 | 4/1975 | Porter | 222/80 |
| 3,972,201 | 8/1976 | Datis | 62/54 |
| 4,751,119 | 6/1988 | Yukawa | 428/35 |
| 4,784,678 | 11/1988 | Gupta | 62/4 |
| 4,816,048 | 3/1989 | Kimmelshue | 62/4 |
| 4,993,237 | 2/1991 | Bond | 62/294 |
| 5,131,239 | 7/1992 | Wilson | 62/293 |
| 5,154,067 | 10/1992 | Tomizawa et al. | 62/294 |
| 5,163,504 | 11/1992 | Resnick | 165/47 |
| 5,168,708 | 12/1992 | Siegel | 62/4 |
| 5,201,183 | 4/1993 | Ramos | 62/4 |
| 5,730,957 | 3/1998 | Rizk | 424/45 |
| 5,842,350 | 12/1998 | Spinner et al. | 62/86 |

FOREIGN PATENT DOCUMENTS

| | | | |
|---|---|---|---|
| 0286382 | 4/1988 | European Pat. Off. | F25D 5/02 |
| 0297724 | 6/1988 | European Pat. Off. | F25D 5/02 |
| WO 85/02009 | 10/1983 | France | F25D 7/00 |
| 1455188 | 5/1973 | United Kingdom | F24J 1/00 |
| 1451217 | 11/1973 | United Kingdom | A47J 36/28 |
| 2261501 | 11/1991 | United Kingdom | A47J 36/28 |

*Primary Examiner*—Gabrielle Brouillette
*Assistant Examiner*—Hao Mai
*Attorney, Agent, or Firm*—Foley & Lardner

[57] ABSTRACT

A self cooling beverage container or can. Different embodiments of a self cooling can are shown including the use of an endothermic reaction perhaps between ammonium nitrate and water. In another embodiment a volatile liquid is evaporated. In another embodiment water is maintained in a low pressure environment and allowed to boil. The vapour which is produced from the boiling water is absorbed by a desiccant maintaining the boiling process. The cooling process may be initiated by the pressure release of a carbonated beverage can during opening of the can.

43 Claims, 19 Drawing Sheets

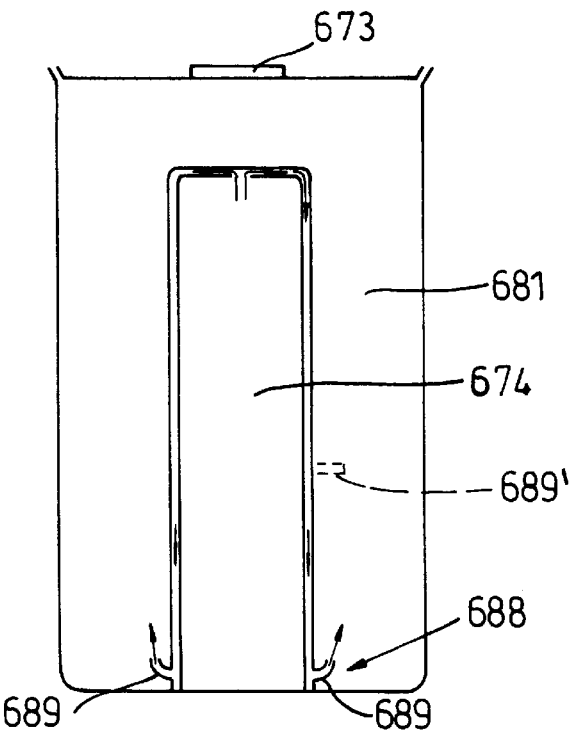
*Fig. 4*
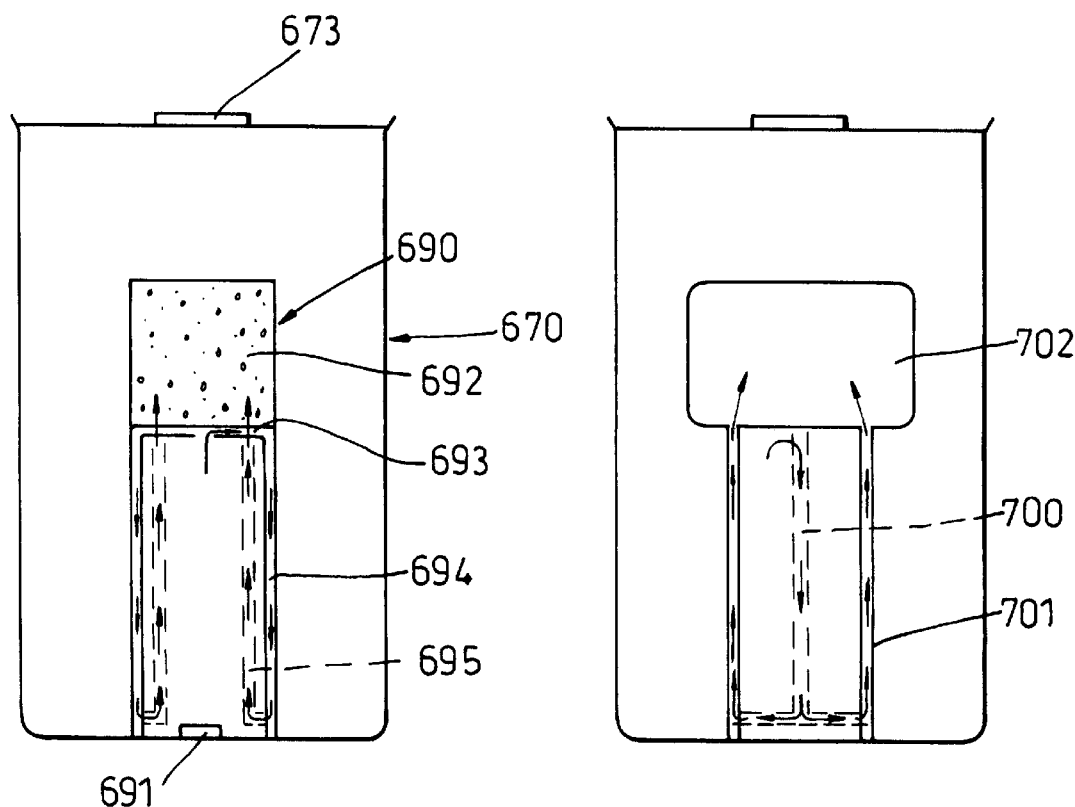
*Fig. 5*  *Fig. 6*

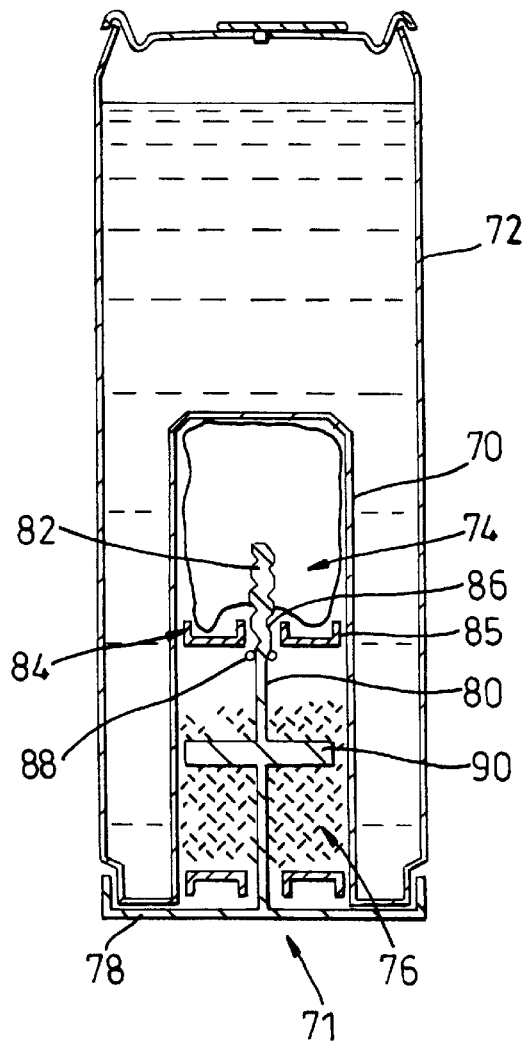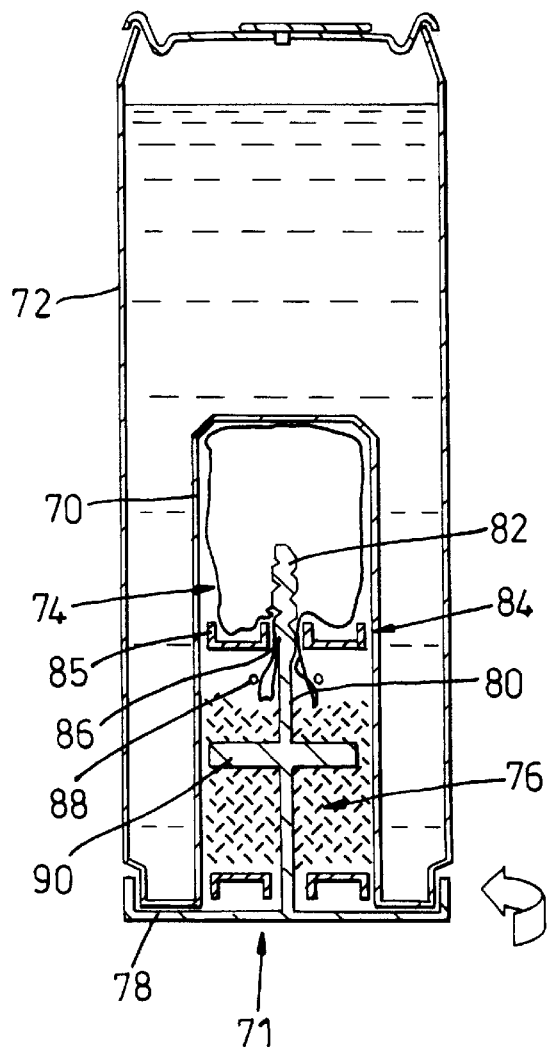
*Fig. 12*     *Fig. 13*

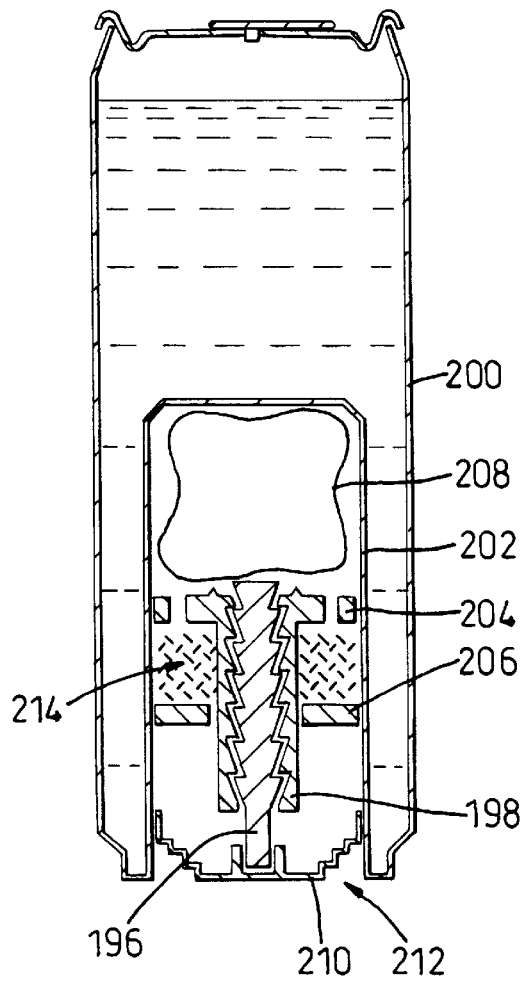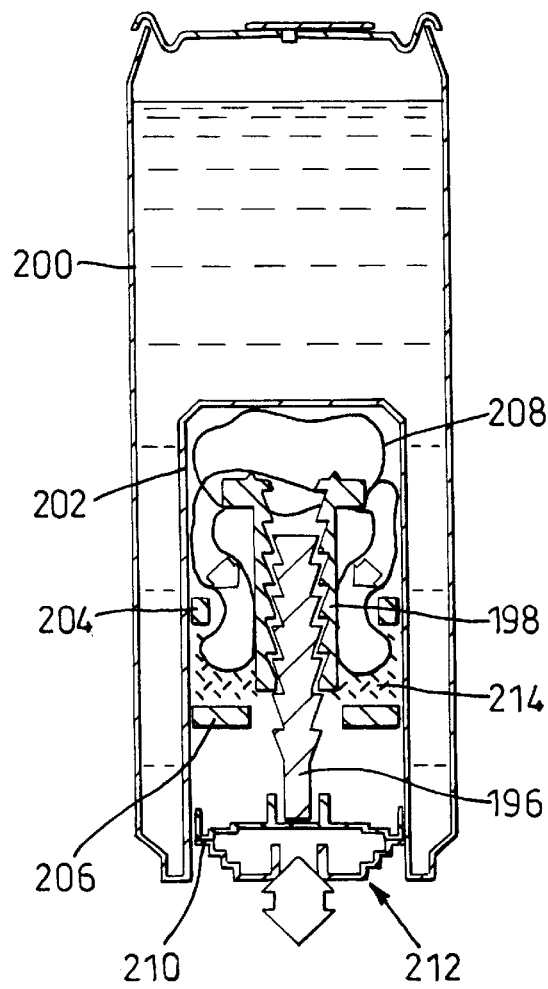
*Fig. 18*  *Fig. 19*

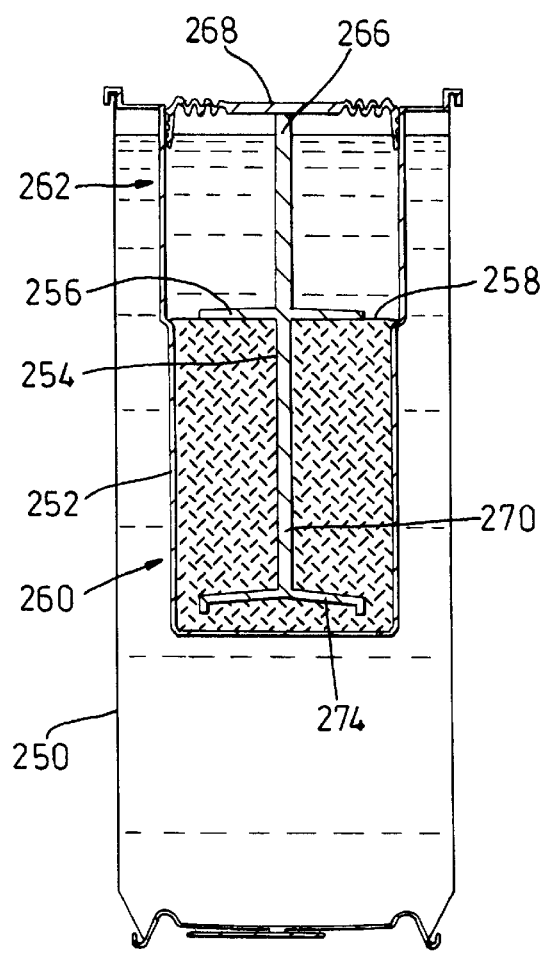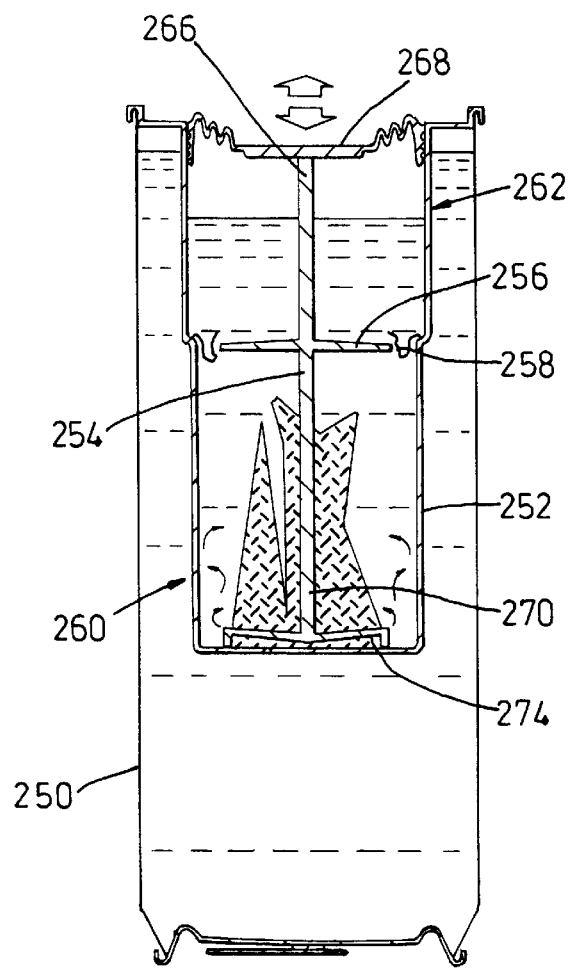
*Fig. 22*  *Fig. 23*

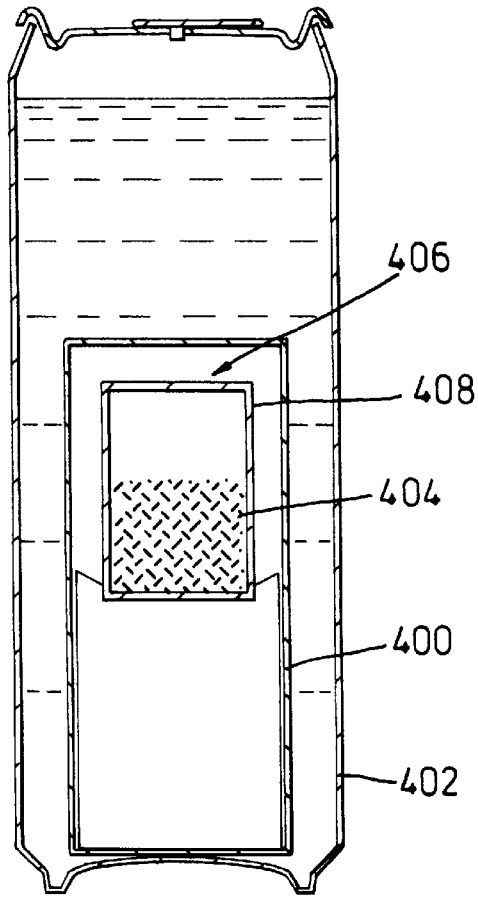
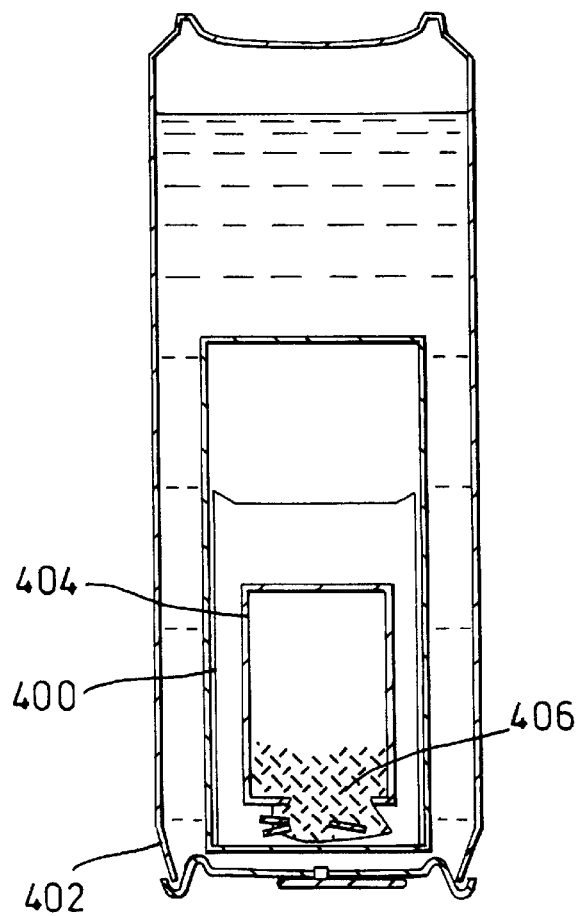
*Fig. 28*   *Fig. 29*

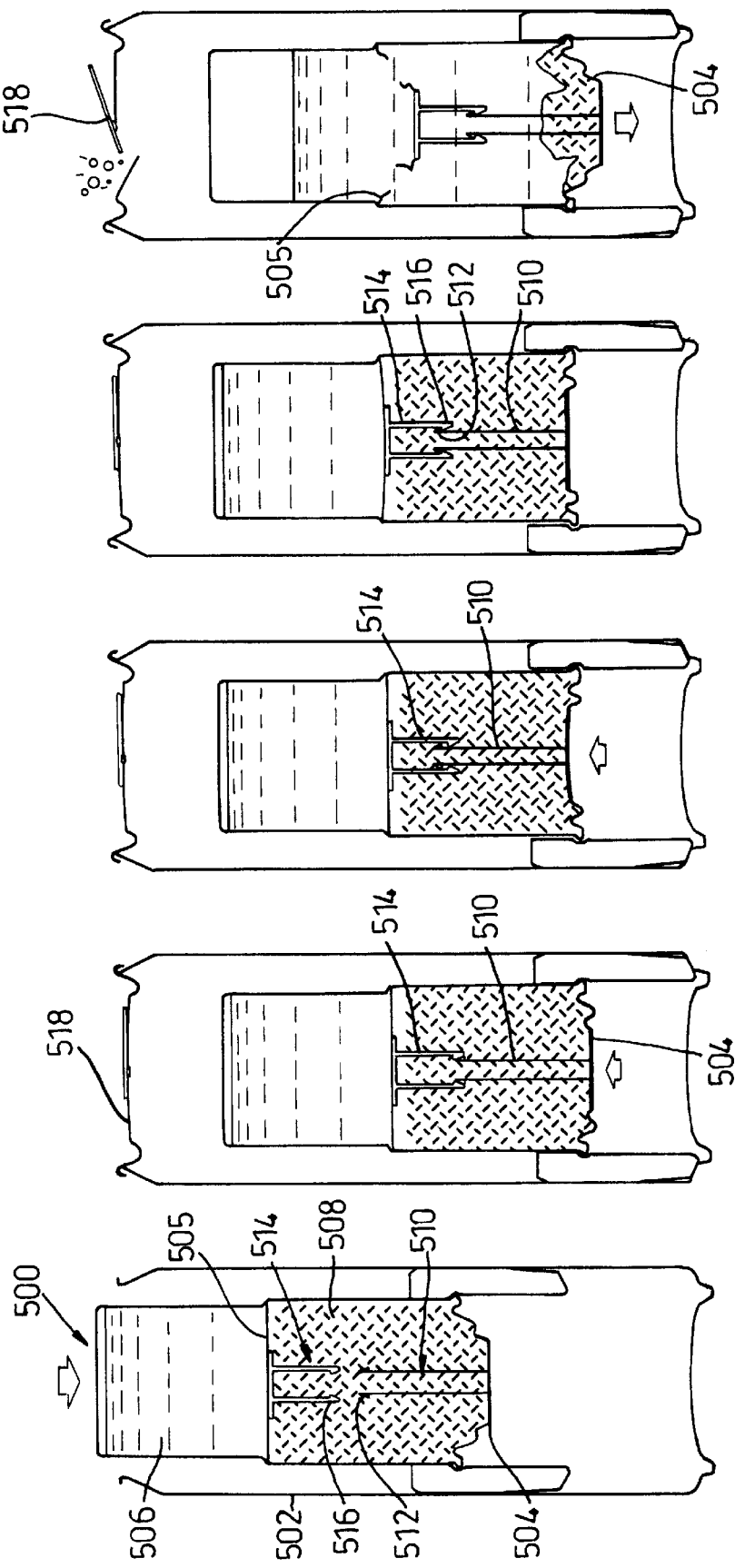

SELF-COOLING CONTAINERS OF BEVERAGE AND FOODSTUFFS

This invention relates to self-cooling containers of beverages, such as cans of beverage (soft drinks or alcoholic drinks such as beer), and to self-cooling containers of foodstuffs.

It is been desired for many years to produce a self-cooling can for beverages (and foodstuffs). The following will discuss beverages, but the invention is also applicable to cooling food. There have been many proposals, but none have been successful commercially.

Three main techniques have previously been proposed: using an endothermic reaction to cool a liquid that is in thermal contact with the beverage (e.g. dissolving a powder in water); using the latent heat of transformation to cool the beverage as a liquid boils to a gas (or in the case of solid $CO_2$ sublines to a gas) to cool the beverage; and using the rapid expansion of a pressurised (possibly liquefied) gas to cool a beverage in thermal contact with the liquefied gas/highly pressurised gas.

Recently, there has been a proposal by The Joseph Company to cool a beverage by allowing a pressurised liquid hydrofluorocarbon to be de-pressurised and undergo boiling and rapid expansion, taking advantage of the thermal energy required to undergo the phase change and that required to expand the gas produced. The Joseph Company say that this will be put into production in 1997.

We aim to provide an alternative way of providing self-cooling beverage (or food produce) containers.

According to a first aspect of the invention we provide a self-cooling beverage or foodstuff container comprising:

a beverage (or foodstuff) chamber having beverage (or foodstuff) retained in it;

a solvent chamber having pressurised solvent retained in it;

a pressurised gas dissolved in the pressurised solvent;

pressurisation means adapted to hold the pressurised solvent with its dissolved gas at a pressure above atmospheric pressure;

de-pressurisation means adapted to release the pressure in the solvent chamber;

the arrangement being such that, in use, when the pressurised solvent chamber is de-pressurised the dissolved gas comes out of solution and expands, extracting heat from the solvent/beverage system, there being heat transfer means adapted to transfer heat from the beverage to the solvent and/or to the gas released from the solvent, the overall result being a cooling of the beverage (or foodstuff).

Thus, we use the release of a gas from a solvent to cool, rather than the boiling of the solvent or a liquid-to-gas phase change of the solvent. This is different from the prior art discussed above. It allows us to use different solvents than have previously been used, and in some embodiments to retain a substantial part of the solvent in the container after the cooling operation has been performed. This can reduce atmospheric pollution.

The fact that we do not need a liquid that will boil at room temperature means that we are not forced to use HFC's, which are increasingly being found to be bad for the environment.

Of course, we prefer to choose the solvent-dissolved gas system to be such that the gas that is released to atmosphere is environmentally acceptable. At present, we prefer to use carbon dioxide ($CO_2$) as the gas, or perhaps nitrous oxide ($N_2O$). Ideally, we would like to use nitrogen as the gas (or a noble gas), but as brewers we are not fully familiar with all known solvents. A man skilled in the art of solvent does, of course, know all known solvents and may well be able to identify one which dissolves nitrogen well, and which will give a satisfactory result. We do seek protection for that combination.

We prefer the solvent to have a relatively low boiling point. This can help since it can contribute evaporative cooling effects.

Of course, if the man skilled in the art of solvents knows of the existence of an acceptable solvent that dissolves a lot of an acceptable gas, and that is liquid when pressurized but gaseous at room temperature and pressure, we would envisage using that solvent-gas combination, and seek protection for that. We would then get phase-change heat extraction, as well as dissolved gas to non-dissolved gas heat of solution cooling, and gas expansion cooling.

We prefer the solvent to have a boiling point of 60° C. or less, or 50° C. or less, or 45° C. or less, or 30° C. or less, or 20° C. or less, or 10° C. or less, or 0° C. or less, or −20° C. or less, or to have the boiling point in the ranges defined at or between the above value.

By "acceptable solvent" and "acceptable gas" we mean ones that are not going to hurt a user (e.g. non-toxic) and than are reasonably acceptable to the environment. We prefer that they not be HFC's and not be other substances which are known to damage the Ozone layer substantially.

We have identified one solvent that is acceptable, and that is methylal (dimethoxymethane: $CH_3$—O—$CH_2$—O—$CH_3$)

This has a boiling point at normal atmosphere pressure of 42.3° C. It is non-toxic. It is not a HFC. It is especially useful because it is in commercial production. It has the very useful property of being able to dissolve enormous amounts of $CO_2$ (and nitrous oxide). We can, at about 7 bar, get about 20% by mass $CO_2$ dissolved in methylal.

By getting so much gas dissolved we can get substantial cooling as the gas comes out of solution and expands to atmospheric pressure.

We prefer to keep the expanded (cold) gas in contact with the beverage container for some time as it escapes to atmosphere, so as to allow time for heat transfer. This can be achieved by using narrow escape channels, and increasing the path length for escape (non-direct, winding, escape route).

We prefer to pressurise the solvent/dissolved gas to at least 2 or 3 bar, and preferably to 4, 5 or 6 bar or above. We have found that with methylal and $CO_2$ about 7 or 8 bar may be the optimum, with about 20% by weight $CO_2$ dissolved in the methylal. We may go to 9, 10, 11, 12 bar or above, possibly up to 15 bar or above, but at present a container with its solvent pressurised to 7 or 8 bar is seen as desirable. This is not so high a pressure as to require massive containers, but enough to get a lot of $CO_2$ dissolved.

We prefer to arrange a container/beverage (or foodstuff)/solvent/gas so as to achieve in use a temperature drop of the beverage (or foodstuff) of 5° C. or more, or 10° C. or more, or 15° C. or more, or 20° C. or more, 25° C. or more, 30° C. or more, or even 35° C. or 40° C. or more.

The amount of gas dissolved in the solvent is preferably at least 3%, or at least 5%, or at least 10%, or at least 15%, or at least 20%, or 25% or more (mass of gas to mass of solvent). Alternatively the amount of dissolved gas could be in the range 5–10%, 10–15%, 15–20%, 20–25%, or more.

The ratio of mass of beverage to (or foodstuff) solvent (+gas) is such as to achieve a desired cooling.

We may not vent the evolved gas directly to atmosphere. It may never reach atmosphere (or a substantial fraction of the evolved gas may never reach atmosphere).

We may arrange for the gas evolved from the solvent to be released into the beverage (or foodstuff). If the gas is passed directly through the beverage there is direct thermal contact between the cold gas and the beverage, which may be a desirable way of cooling the beverage. Preferably the gas is $CO_2$, or $N_2$, or a $CO_2/N_2$ mixture. The beverage may be pressurised to substantially 1 bar above atmospheric pressure.

In the case of beer, ale, lager, stout, and the like, releasing or venting the gas through the beverage may help in head formation when the beverage is dispensed. Many so-called "widget devices" have a stream of bubbles passing through the beer to form nucleation sites for a good head. Our device may perform the dual function of achieving significant cooling and head generation/enhancing. When the gas is $CO_2/N_2/CO_2+N_2$ mixture we may be able to use the evolved gas from the solvent to assist in providing the desired dissolved gas content of the beer. For example we may dissolve less (or significantly less) $CO_2/N_2$ in the beer during the filling process of the container than we desire to be present in the beverage during dispensing of the beverage and/or in the beverage in the glass immediately post-dispense.

We may allow a significant period of time between beginning to evolve gas from the solvent and opening the beverage container (long enough to cool, and also possibly long enough for evolved gas to be dissolved in the beverage).

We may vent all of the evolved gas through the beverage or foodstuff or only a portion of it. The act of de-pressurising the beverage (or foodstuff) chamber may trigger venting of evolved gas through the beverage/foodstuff, preferably via a mechanism that is dependent upon the change from pressurised beverage to unpressurised beverage.

Instead of, or in addition to, passing the evolved gas through the beverage or foodstuff we may provide trap means adapted to prevent the gas, or at least some components of the gas, from reaching atmosphere.

The trap means may comprise an expansion chamber, which may initially be provided at a low pressure (possibly below atmospheric pressure), and possibly an evacuated chamber. We may provide a flexible, stretchable, vent chamber, possibly at least partially outside of rigid walls of the container, the vent chamber swelling as gas is evolved.

We may provide adsorption, or pressure-reducing, means adapted to hold evolved gas. The adsorption means may both prevent the evolved gas from reaching atmosphere and reduce the pressure of gas above the body of solvent, thereby facilitating more evaporation of solvent/evolving of gas out of the solvent.

The adsorption means may comprise activated charcoal, or a zeolite, or a dessicant, or some other thing that captures at least a component of gas. We may prefer to capture harmful substances and allow to pass less harmful substances (e.g. water).

Venting none or little gas to atmosphere reduces pollution and the environmental impact of the containers.

We may provide thermal insulation around the absorption means. Absorbing a gas can be an exothermic process, and since we wish to cool the beverage (or foodstuff) we may thermally insulate the absorbent material.

The adsorbent material may be provided in a vent chamber, and many occupy substantially less than the whole volume of the vent chamber.

We may throttle the gas outlet from the container (which may be a metal can, or a plastics can, or a metal or plastics can or bottle), or a composite structure with different materials for different structures which, in use, experience different forces.

The beverage may have a dissolved gas (e.g. $CO_2$ and/or $N_2$) and may be pressurised. Typical pressures for the beverage may be about 1 bar. The beverage is preferably beer, ale, lager, porter, cider, stout, or the like, but it could be a soft drink.

When a gas comes out of solution there may be a heat of solution involved. This can be an endothermic effect, which can help cool the solvent.

When gas comes out of solution, it is initially very, very, tiny bubbles. These expand rapidly. The gas that is evolved from the surface of the solvent may also continue to expand (depending what is the top gas pressure at that instant). This will cause expansion cooling.

As bubbles rise to the surface of the solvent small droplets of solvent will be carried into the top gas above the body of the solvent, and this will promote faster evaporation/semi-forced boiling of the solvent, which will also cool the gas above the body of the solvent. A low boiling point solvent will have a greater degree of evaporation/spray cooling in this way.

We prefer to have at least 1% to 5% of the mass of the solvent evolved during the gas venting operation, and possibly 5% to 10%, 10%–15% or even 20% (or more) of the solvent mass evolved. Alternatively, we may wish to minimise or restrict solvent loss, and the figures given above may be upper limits to acceptable loss of solvent.

In addition to believing methylal to be good solvent for our invention, we want to protect methylal-like solvents: those with a similar chemical structure and/or which have similar physical properties so far as the cooling process is concerned. It may be possible to modify the methylal molecule to enable it to dissolve $CO_2$ (or another gas) better.

We may use a mixture of substances as the solvent (e.g. methylal plus other substances, such as ethanol, or dimethyl ether). The solvent preferably contains at least some methylal, and preferably at least 10%, 20%, 30%, 40%, 50%, 60%, 70%, 80%, or 90%, or about 100% methylal (% by mass, or by mole-per-cent), or any range defined between the figures listed.

We may dissolve more than one sort of gas in the solvent. It may be possible to get more total gas moles dissolved into a solvent by dissolving more than one gas. Similarly, it may be possible to get more of a gas (e.g. $CO_2$) (or a mixture of gases) into a given volume of solvent if the solvent is a mixture of compounds. The solvent may be saturated with gas.

We may prefer to have a methylal/water mixture as the solvent. Methylal is miscible in water at practically all concentrations, which enables us to have a mixture that has a significant water content. Releasing a methylal/water mixture into the environment has less of an environmental impact than releasing pure methylal—water is seldom seen as being environmentally harmful. We may prefer to have a relatively large volume of solvent because it may be easier to control/release gas over a long extended time than to do so with a smaller volume of solvent with the same amount of gas dissolved in it. Mixing a desired amount of methylal (or the like gas-holding liquid or material) with a volume of water may enable us to reduce the environmental impact and slow down the gas release (and extend the cooling effect over a longer time), in comparison with an equivalent mass of pure methylal.

Altering the relative amounts of different components of the solvent may enable us to alter the solubility of selected gases in the solvent mixture.

Preferably the solvent is saturated with gas (e.g. substantially pure methylal saturated with $CO_2$, or a methylal mixture saturated with $CO_2$, or a $CO_2/N_2$ mixture). The gas may be a mixture of $CO_2/N_2$, typically at a suitable ratio found in an alcoholic beverage. The ratio of $CO_2/N_2$ in the gas evolved from the solvent may be above, at, or below, the ratio of $CO_2/N_2$ present in the beverage.

The solvent may be super-saturated with gas. We may dissolve gas in the solvent at a dissolving pressure (e.g. 15 bar) which is higher than the storage pressure in the solvent chamber once the container has been manufactured (e.g. 7 bar). This may enable us to get even more gas into a given volume of solvent. The ratio of dissolving pressure to storage pressure may be at any point at or between the following figures: 4:3, 3:2, 2:1, 3:1, 4:1, 5:1, 6:1, 7:1, 8:1, 9:1, 10:1, 20:1, 30:1, 40+:1.

The temperature of the solvent at a super-saturisation operation may be different from room temperature. If the gas dissolved better when the solvent is cold, it may be well below room temperature. The temperature for dissolving the gas in the solvent may be a little above its freezing point, or at least generally near its freezing point. The dissolving temperature may be 30° C., 20° C., 10° C., 0° C., −10° C., −20° C., −30° C., −40° C., −50° C., −60° C., −70° C., −80° C. or below, or in any range defined between those points/values.

The container may be a single use disposable container. Alternatively, or additionally, the container may comprise a chamber adapted to be coupled to a removable/separable cooling cartridge. The cooling cartridge may comprise the solvent chamber.

The container may be refillable with beverage (or foodstuff) and which is reusable. The beverage or food chamber may be re-pressurisable during refilling.

According to a second aspect of the invention we provide a method of providing a self-cooling beverage (or foodstuff) container comprising dissolving gas in a solvent liquid, retaining the solvent liquid in the container at a pressure that is significantly above atmospheric pressure, de-pressurising the solvent so as to cause gas to come out of the solution, and using the expansion of the freed gas to cool the beverage (or foodstuff).

Preferably the gas also has an exothermic heat of solution so that when it comes out of solution there is an endothermic effect. The method preferably also comprises using that endothermic effect to cool the beverage (or foodstuff). Preferably at least some of the solvent is evaporated/vaporised during the release of its dissolved gas, requiring heat of vaporisation to be provided, and the method may use this as a further cooling effect to cool the beverage (or foodstuff). The emission of the gas coming out of solution may cool the beverage. At least some of the solvent may be evaporated/vapourised during the release of the dissolved gas.

Preferably the method comprises providing the solvent and beverage (or foodstuff) in thermal communication in the container. It may be possible to arrange for substantially all of the heat transfer to occur between cold gas and the beverage (or foodstuff), but we much prefer to have heat transfer between the cooled solvent and the beverage or foodstuff (as well, or predominantly).

Evolved gas may be passed through the beverage or may be the solvent.

The method preferably comprises selecting methylal as the solvent, or a solvent that has high levels of methylal.

We may add to the solvent a substance that renders the solvent and/or it vapour non-inflammable, or which reduces the flammability of the solvent and/or its vapour.

The method may comprise dissolving the gas in the solvent at one pressure and/or temperature, introducing the solvent and its dissolved gas to the solvent chamber, closing the solvent chamber and/or container, and allowing the pressure in the solvent chamber and/or temperature there to be different during the storage and use of the filled container from the temperature and/or pressure experienced by the solvent during the gas-dissolving operation, thereby super-saturating the solvent with gas.

The pressure at which the gas is dissolved in the solvent may be significantly higher than that at which the solvent is held in the solvent chamber during storage and use of the container.

The temperature at which the gas is dissolved in the solvent may be significantly lower than the storage and use temperature of the container.

A solvent chamber may contain a solvent having a gas dissolved in it and being adapted to be de-pressurised so as to allow the gas to come out of solution and cool the solvent.

We may provide an insert adapted to be coupled with a container body to form a container having an insert, the insert having: a solvent chamber provided with pressurised solvent retained in it, and having a pressurised gas dissolved in the pressurised solvent; pressurisation means adapted to retain the pressurised solvent with its dissolved gas at a pressure above atmospheric pressure; and de-pressurisation means adapted to relieve the pressure in the solvent chamber do as to enable, in use, dissolved gas to come out of solution and expand, extracting heat from the solvent.

We may provide a container shell adapted to be filled with beverage or food and containing an insert.

The container may be a single use disposable container, or we may provide the container in a form adapted to be re-used or recycled. A customer may be encouraged to return a used container to us for re-cycling. We may be able to re-use the container or re-use the cooling mechanism. The container may comprise a beverage (or foodstuff) chamber adapted to be coupled to a cooling cartridge. The cooling cartridge may comprise the solvent chamber and may be releasable from the container, possibly only after discharge of the beverage and/or gas from the cooling cartridge. We may be able to re-charge the cooling cartridge with gas, or with solvent, or with gas dissolved in solvent.

We may simply receive used containers and separate out the container bodies and cooling cartridges for independent re-cycling/waste disposal. This gives us control over how the spent cartridges are re-cycled or disposed of.

The beverage (or foodstuff) container may be re-fillable with beverage (or foodstuff) and may be re-usable.

According to a third aspect of the invention there is provided a beverage, or other foodstuff, container which is provided with a cooling means adapted, in use, to chill a beverage, or foodstuff, contained within the container.

The beverage container may be a can.

Preferably the container looks like a standard container for that particular product. That is the container may look like a container which is usually used to hold that product but without the ability to chill the contents. This provides market continuity for the users of the product.

The container may use an endothermic dissolving or dissolution of a first chemical into a second chemical to achieve cooling. Advantages of this include the ability to avoid the need to use an ozone destroying refrigerant.

The first chemical may be ammonium nitrate. The second chemical may be water. These chemicals are advantageous because they are relatively cheap, of low toxicity, and relatively easy to obtain.

A cooling chamber may be provided which contains the cooling means so as to maintain the cooling means separate from the beverage contained within the container. An advantage of this is that contamination, or training, of the beverage is avoided.

The cooling chamber may be provided within the container. Alternatively, or additionally, the cooling chamber may be provided in association with the outside of the container (perhaps as a jacket, or similar).

Should the cooling chamber be provided within the can or other container it may be provided as a cylindrical chamber. This has the advantage that it is easy to fabricate, and is a robust shape so that it can be readily adapted to withstand the pressures exerted upon it within a canning production process.

The cooling chamber may be provided as blind bore integrally formed in to lower end portion of a container or can. An advantage of this is that the resulting structure is cheap to manufacture and robust.

An external activation means may be provided on the can to activate the cooling means. This has the advantage that the activation means is readily accessible by a user.

Alternatively, an internal activation means may be provided which may operate when the beverage, or foodstuff, container is opened so providing a container which automatically cools the beverage within when it is opened.

An internal activation means may be operated by a drop in pressure as the container is opened. Such a drop in pressure is well known when cans containing carbonated beverages are opened.

The activation means may cause a membrane, divider, partition, bag, or other such device (hereinafter referred to as a membrane) which separates the two chemicals (perhaps each contained in a separate portion of the cooling chamber) to rupture thus allowing the two chemicals to mix and the endothermic dissolution process to begin.

The membrane may comprise a burstable bag, or other similar volume containing structure, which separates the first and second chemicals (or may prevent a chemical being released).

The membrane may be ruptured by a sharp barb, blade, or other similar structure, being caused to penetrate the membrane by the activation means. Alternatively, or additionally, the membrane may have a frangible joint which is caused to break by the activation means. In yet a further embodiment the membrane may be ruptured by a screw or other such helical device. A component of the cooling chamber (or in the cooling chamber) may be pulled or pushed against a disruption element to break the seal allowing two chemicals to mix, or releasing a chemical. In yet another embodiment a soluble membrane is provided which dissolves allowing the two chemicals to mix.

Another possible activation means may be the provision of a bellows type arrangement which when compressed, in use, causes the membrane to rupture. A plunger may be provided which when, in use, is pressed causes the membrane to rupture. All of these alternatives provide suitable mechanisms for allowing the two chemicals to mix.

The membrane means may comprise at least two plates, perhaps axially aligned and perhaps next to one another, each of which contains at least one hole or passage. In the unactivated sate these holes or passages may be unaligned, and the activation means may align the holes or passages. This alignment may allow the two chemicals to mix (perhaps by interconnecting two portions of a chamber, or two separate chambers).

An agitation means may be provided to ensure the first and second chemicals are mixed properly so ensuring that the endothermic dissolution process proceeds at a satisfactory rate. The agitation means may be manually powered or powered by a power source (e.g. a battery, such as a watch battery).

The activation means may comprise a handle providing a convenient means for a user to grasp. The handle may be connected to the agitation means so that as the user moves the handle the agitation means is operated.

The agitation means may be provided in association with the membrane means. Alternatively, or additionally, the agitation means may be remote from the membrane means.

The agitation means may comprise vanes, which may be in contact with the first and second chemicals and may possibly be adapted to move about an axis of rotation. When the vanes are rotated, or moved angularly, (possibly in a cyclic motion) the first and second chemicals are agitated.

Alternatively, or additionally, the agitation means may comprise a member, e.g. a perforated plate, which as it is moved through the first and second chemicals causes agitation and speeds the reaction. The member may be moved in a straight line. It may be reciprocated.

Alternatively, or additionally, the agitation means may comprise a piston or other such like structure which is adapted, in use, to be moved, possibly, cyclically in an axial direction within the first and second chemicals once they have been mixed.

The agitation means may be thought of as a turbulence inducing means. Alternatively, or additionally, a separate turbulence inducing means may be provided. Such a separate turbulence inducing means may comprise a holes, ducts, openings, etc, in a member. The member may be a wall member, or may be in the agitation means. Such a wall member may be in a fixed relationship to the can or the cooling chamber.

The agitation means alternatively, or additionally, may comprise a means powered from an external source; perhaps an electric motor connected to a vaned member or other such impeller or stirring means, or is perhaps an electric pump. The power source may be a battery, perhaps a watch type battery. Alternatively, or additionally, the power source may comprise a solar cell.

A micro processor or other suitable integrated circuit (for instance a programmable logic array, etc.) may be used to control an electrically powered agitation means. An advantage of this is that the mixing process could be controlled accurately.

Switch means may be provided on the outside of the container to activate an electrically powered agitation means. The switch means may comprise an activation means.

Magnetic coupling means may be provided to link the agitation means provided inside the container to an operative means outside the container. This may be convenient in some situations allowing the agitation means to be activated without compromising the integrity of the container. This may removing the need for seals, etc.

In yet another embodiment the agitation means may comprise a bellows means which are adapted, in use, to be activated, so as cause turbulence within the first and second chemicals. Activation of the bellows may comprise compression of the bellows followed by subsequent release.

The bellows means may comprise a bulb of resilient material or may comprise a container of resilient material with corrugated walls. Both of these provide suitable means to impart turbulence into the mixed first and second chemicals.

In yet a further embodiment a rack and pawl mechanism may be provided which can be repeatedly activated and thus impart a movement of one of the parts of the mechanism relative to the other of the parts. Such a mechanism can prove useful in progressively acting upon a membrane; the relative movement of one of the parts can be utilized.

Perhaps the membrane may comprise a bag containing one of the two chemicals and the rack and pawl mechanism can be used to burst the bag and subsequently act upon the bag, as the mechanism is repeatedly activated, thus ensuring that the contents of the bag are emptied.

An activation means may be provided to act upon the rack and pawl mechanism.

A heat transfer means may be provided to ensure that more efficient heat transfer occurs between the cooling means and the beverage, or foodstuff, contained in the container.

The heat transfer means may comprise a cylinder with corrugated or grooved walls so as to provide a large area over which heat transfer can occur.

Preferably the heat transfer means is fabricated from a metal. A metal heat transfer means is advantageous because they can be cheap and yet have are good conductors of heat.

The heat transfer means may be the cooling chamber.

Alternatively, or additionally, the container may use a Peltier effect cooling system. When a battery, or other electrical power source, is provided it may power a Peltier effect cooler and mixing or stirring means.

Yet another alternative, or addition, would be the use of evaporation of water (or another liquid) to provide the cooling effect. Preferably the evaporation of the water would be vacuum driven. The use of water is advantageous because water is non toxic, readily available and inexpensive.

A desiccant material may be used to facilitate this. Advantages of such a system are that the pressures involved are low, and also desiccant materials are relatively inexpensive.

The desiccant may be calcium sulphate, or may be silica gel, or may be low density silica gel, or may be a zeolite. Each of these chemicals would exhibit the desired properties.

Insulation may be provided adjacent a desiccant or adsorbent material. Insulation can prevent heat released in a hydration process from reaching the contents of the container. Clearly, this is advantageous because this prevents the contents from being heated rather that cooled.

In still yet another embodiment the heat adsorbed to evaporate a volatile liquid may be utilised, or indeed the boiling of (or expansion of) a compressed gas may be utilised.

The gas may be butane, propane, carbon dioxide, a hydrofluorocarbon (HFC) (perhaps HFC134a or perhaps HFC152a), nitrogen, dimethyl ether, or other suitable refrigerant gas.

Advantages of Butane and Propane are that they are low cost and already widely used in aerosols.

Carbon dioxide is advantageous in that it is non-toxic, is readily available.

Hydrocarbons are advantageous because they are good refrigerants, require a large amount of heat to evaporate, and are non-flammable.

A vortex tube means may be used to restrict the rate at which the gas boils by restricting the rate at which the gas escapes to the atmosphere.

A pressurisable container capable of maintaining the gas or the liquid under pressure may be provided to hold the gas or liquid.

The container may be adapted to be recycled once the container has been used. The container may therefore contain only (or substantially only) materials which are readily recyclable and in the preferred embodiment the container may be manufactured from substantially only one material. It is obviously recognised that a small amount of other material (for instance sealing members, paints, lacquers, etc.) will need to be used in association with the container.

The pressurisable container may be provided as a recyclable unit which is inserted into a can to allow the can to perform its self cooling function. The pressurisable container may be insertable into and removable from the container.

Preferably the container is adapted, in use, to reduce the temperature of its contents by substantially between 5° C. and 19° C. Possibly by about between 9° C. and 15° C. In one embodiment the container reduces the temperature of its contents by at least 12° C. These ranges provide a suitable temperature drop so that the beverage, or foodstuff can be cooled from ambient temperature to a temperature at which they are pleasant to consume.

The contents of the container may be cooled to substantially between 4° C. and 10° C. Preferably the contents of the container are cooled to substantially between 6° C. and 8° C. Again the contents of the container may be pleasant to consume once they have been cooled to within this temperature range.

Ideally the cooling of the contents may take place in substantially 30 seconds, or 45 seconds, or 60 seconds, or 75 seconds, or 90 seconds, or 120 seconds or 180 seconds, or any intermediate time between these time periods. These time periods are believed to be the length of time a user of the container may find convenient to wait for the contents of the container to be cooled.

Preferably the volume of beverage or foodstuff which can be held within the container is substantially 330 ml. Of course other volumes may be allowable: perhaps 250 ml, 500 ml.

The container may meet food and hygiene legislatory requirements.

The skilled person will appreciate that the agitation means may also function as the activation means and vice versa.

According to a fourth aspect of the invention there is provided a method of cooling a beverage or foodstuff container.

The method may include using an endothermic dissolution process, or may be relies on the Peltier effect, or may be the evaporation of water or other liquid, or may be the evaporation of a volatile liquid, or may be the boiling of a compressed gas.

The method may include mixing a first and a second chemical to cool the contents of the container. The first chemical may be water. The second chemical may be ammonium nitrate.

Should a gas be used it may be butane, or propane, or carbon dioxide, or nitrogen, or dimethyl ether, or an HFC (perhaps HFC134a or perhaps HFC152a).

The method may utilise any of the features described in relation to the first aspect of the invention.

According to a fifth aspect of the invention there is provided an insert for a beverage, or foodstuff, container which, in use, cools the contents of the container.

According to a sixth aspect of the invention there is provided beverage, or foodstuff container, which has been filled with a beverage or foodstuff and also filled with an insert according to the third aspect of the invention.

BRIEF DESCRIPTION OF THE DRAWINGS

There now follows some examples of the present invention which are intended as examples, and are not limiting.

Some of the examples will refer to the accompanying drawings of which:

FIG. 1C shows a can that has been opened and allowed to stand for a while;

FIG. 4 shows a container where evolved gas is released into the beverage or foodstuff;

FIG. 5 shows a container where evolved gas is released into adsorbent material;

FIG. 6 shows a container where evolved gas is trapped in an expansion chamber;

FIG. 12 shows a schematic diagram of a beverage of foodstuff container with a cooling means according to the present invention which has a rotatable activation means together with vanes or agitation means;

FIG. 13 shows the container of FIG. 12 once the cooling means has been activated;

FIG. 18 shows a schematic diagram of a beverage of foodstuff container with a cooling means according to the present invention with a rack and pawl agitation means;

FIG. 19 shows the container of FIG. 18 with the cooling means in the activated condition;

FIG. 22 shows a schematic diagram of a beverage of foodstuff container with a cooling means according to the present invention similar to that shown in FIGS. 20 and 21 but with an extra agitation means;

FIG. 23 shows the container of FIG. 22 with the cooling means in the activated condition;

FIG. 28 shows a schematic diagram of a beverage of foodstuff container with a cooling means according to the present invention with a soluble membrane;

FIG. 29 shows the container of FIG. 27 with the cooling means in the activated condition;

FIGS. 32 to 36 show the various stages of assembly of a beverage of foodstuff container which has within it an internal activation means;

EXAMPLE 1

In a volume of methylal is pressurised to 7 bar and has 80% by mass methylal and 20% by mass $CO_2$ dissolved in it we expect, upon rapid de-pressurization to atmospheric pressure, a temperature fall of the methylal of about 27° C.

EXAMPLES 2 TO 6

These are given in the table below:

| Example | Starting Pressure (bar a) | Mass (%) Methylal | Mass (%) $CO_2$ | Temperature Drop ° C. |
|---------|---------------------------|-------------------|-----------------|------------------------|
| No. 2   | 10                        | 80                | 20              | 30                     |
| No. 3   | 5                         | 80                | 20              | 23                     |
| No. 4   | 7                         | 80                | 20              | 26                     |
| No. 5   | 10                        | 75                | 25              | 31*                    |
| No. 6   | 10                        | 95                | 5               | 14                     |

*Accuracy Warning

In all cases the temperature fall that we expect to see is with the final pressure being 1 bar (atmosphere). The starting temperature of the (substantially pure) methylal is about 30° C.—a hot day's temperature.

As will be seen above, Examples 1 and 4 (with pressures of about 7 or 8 bar) give us results where we expect to see around 80 to 90% of the temperature drop that using 50% more pressure does (see Examples 2 and 5).

Having a lot more $CO_2$ dissolved does not seem to give a linear effect, but it is true that the more $CO_2$ dissolved the higher the temperature drop.

In Example 1, about 27% of the methylal solvent vents as vapour, leaving about 73% of its mass as a cold liquid.

The above shows that dissolving $CO_2$ in methylal under pressure and then de-pressurising the methylal produces significant cooling. The methylal and $CO_2$ is vented to atmosphere, but $CO_2$ is a natural gas and the amounts involved will not damage the environment, and methylal too is non-toxic. The fact that perhaps a quarter of the volume of methylal escapes is possibly not a major effect in cooling: the methylal acts as a container or reservoir for $CO_2$ (or nitrous oxide).

The specific heat of methylal is about half that of water, which means that for a given heat of solution/heat of expansion exchange the temperature of the methylal changes twice as much as would water, resulting in a great beverage-methylal temperature difference and therefore a more efficient heat exchange between the methylal-beverage.

Figure 1A:
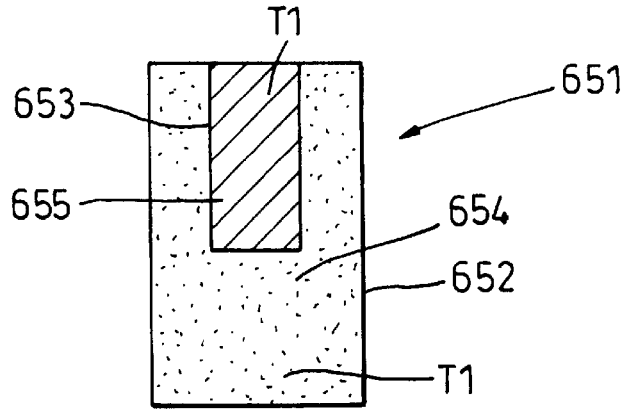
FIG. 1A shows an unopened can.
Figure 1B:
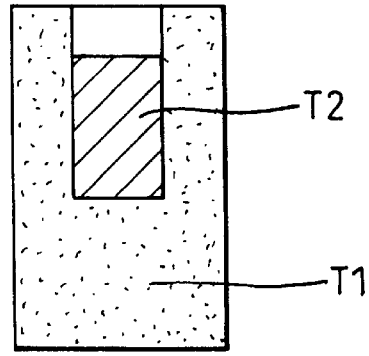
FIG. 1B shows a can that has been opened.
Figure 1C:
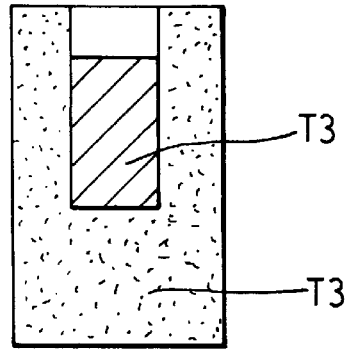

If we consider FIG. 1, this shows a can 651 having a beverage chamber 652 surrounding a solvent chamber 653, beverage 654 in the beverage chamber, and solvent 655 (methylal) in the solvent chamber. It is at room temperature T1.

Figure 2:
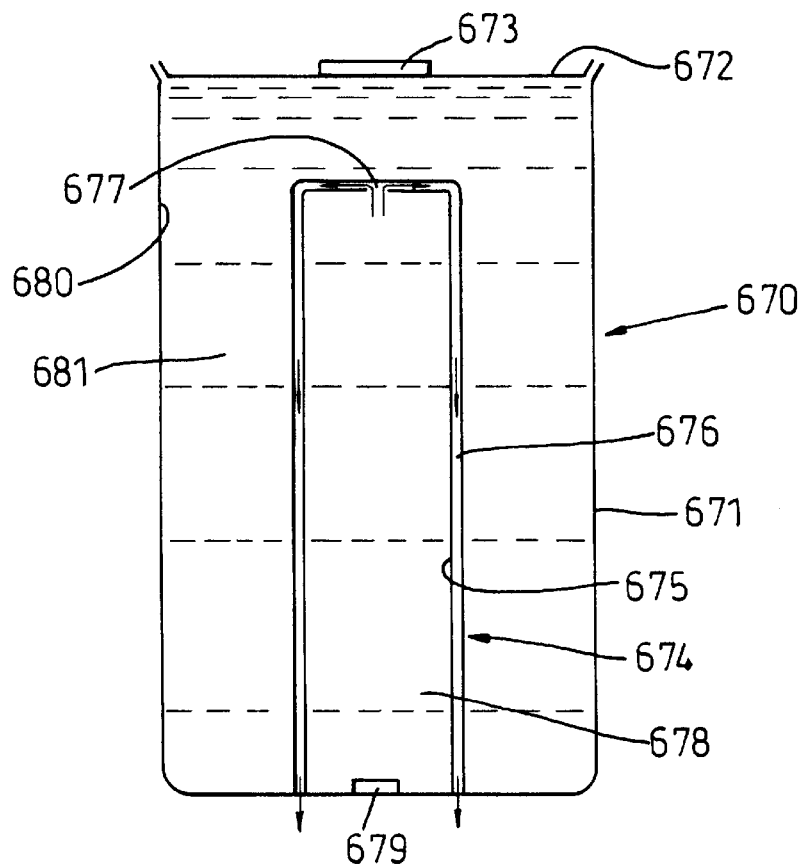
FIG. 2 shows a schematically another can.

The inner solvent chamber initially is at, say, 6 bar and is de-pressurized in a controlled way to atmospheric pressure. Dissolved $CO_2$ gas and some solvent escapes, absorbing energy from the remaining solvent, thereby cooling down the solvent 655 to a temperature T2, and cooling the solvent chamber 653. This is shown in FIG. 2.

Heat then flows from the beverage 654 to the solvent 655, via the walls of the solvent chamber 653 (which may well be made of metal—good thermal conductivity, and good strength) until the temperatures reach (or roughly approach) equilibrium at a temperature of T3. It may be necessary to allow the can to stand for half-a-minute, one minute, one-and-a-half minutes two minutes, or even more than two minutes. We prefer to have approximate equilibrium achieved in under five minutes, and preferably under four minutes, and most preferably under three minutes. The evolving of gas from the beverage may take place in a matter of seconds, but we prefer to control it to take tens of seconds, or even a minute or two.

If we have a can with 330 g of beverage and about 450 g of an 80/20 (by weight) solution of methylal and $CO_2$ at a pressure of 7 bar gauge (about 100 psig) in the inner solvent chamber we aim to achieve an initial temperature drop of about 27° C. for the methylal (or rather for the 73% by weight of the methylal that is left behind, the remainder venting). This will produce a temperature drop of the beverage of about 10° C.

We envisage using $CO_2$ (or $N_2O$) dissolved in methylal as a replacement for more damaging greenhouse gasses. For example, as an alternative to the HFC's used in the Michel-Joseph (Joseph Company) can. We refer the reader to any published patent applications, or articles, on the Michel-Joseph can (e.g. those in the name of The Joseph Corporation or The Joseph Company) and incorporate by reference their disclosure. We would envisage replacing the liquid that is boiled in that technology with $CO_2$ dissolved in methylal. HFA 134a is the solvent preferred by Joseph, but they simply boil it and expand it, without dissolving lots of "benign" gas in it.

Methylal has been commercially available for twenty years or more. The desire to produce self-cooling cans/containers has been around for much the same time. We are the first to realise that the two things can be brought together in a way that works acceptably.

Turning now to FIG. 2, this shows a cylindrical can 670 having an outer metal shell 671, a can end 672 attached to the top of the shell, a tab opening device 673 to enable a user to open the can to drink from it, and a central cylindrical can insert 674. The insert 674 has a central solvent chamber 675 and a plurality of axially extending peripheral capillary channels 676 around its circumferential periphery. The channels 676 extend to the bottom of the can and are ventable to atmosphere. An aperture 677 communicates the solvent chamber 675 with the channels 676. The solvent chamber 675 contains substantially pure methylal 677 which is supersaturated with $CO_2$. The solvent chamber 675 is pressurised to 8 bar.

A de-pressurisation device 679 is provided to de-pressurise the solvent chamber, gas (and entrained/vaporised solvent) escaping along channels 676.

The can shell 671 in combination with the outer walls of the channels 676 defines a beverage chamber 680 which contains a beverage 681 (which may be beer, lager, ale, cider, stout or some other alcoholic beverage), or it may be cola, lemonade, orange juice, water, or some other soft drink (carbonated or still).

As the cold $CO_2$ gas passes along channels 676 it is slowed down to increase the heat exchange time. Valve means may be provided to assist in this. The surface area for heat exchange is high—adjacent channels 676 may define grooves between their channel-defining walls, or fins may be provided.

After activating the de-pressurisation device 679, the user allows the can to stand for about one minute. He then may or may not give it a small shake/activates agitation means to release even more $CO_2$ from the methylal. The user then (possibly after waiting a little longer) opens the tab 673 and can drink the beverage.

Figure 3:
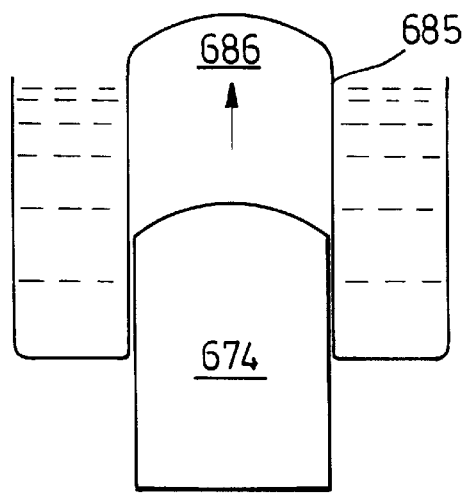
FIG. 3 shows a shell of a can receiving a cooling insert.

An insulation layer or coating may be provided associated with the shell 671. Instead of having an insert 674 in contact with the beverage, the shell may have an internal cylindrical wall 685 defining an internal annular space 686, opening to the base of the can, and the insert may co-operate with that. This illustrated in FIG. 3. The channels 676 could then be defined between the outer surface of the insert 674 and the wall 685.

FIG. 4 shows a cooling insert 674 which has means 688 for releasing evolved gas into the body of a beverage 681. The means 688 comprise, in this example, gas outlets 689 provided near the base of the can, the gas (e.g. $CO_2$) travelling down channels in thermal contact with the beverage 681 before it reaches the outlets 689. This ensures that the gas cools the beverage as it progresses towards the outlets 689. When the gas is bubbled into the beverage it also continues to cool the beverage. Some of the gas may be dissolved in the beverage after it leaves the outlets 689. The gas that dissolves in the beverage may augment any gas dissolved in the beverage upon filling of the beverage chamber (and the gas content of the beverage may be depressed to allow for boosting by evolved gas). Alternatively the gas content of the beverage may be as normal, with little or no effect on gas content due to evolved gas from the solvent being additionally dissolved.

FIG. 4 also shows, at 689, an alternative where the outlets are spaced away from the bottom of the container/beverage chamber. This leaves a body of beverage which does not have gas passed through it—which may be helpful if passing gas through the whole of the height of the beverage produces too large a head. The outlet 689' may be at or near the top of the can. There may be outlets at two or more heights of the can, and they may have different sizes/cross sections, or be throttled differently in some other way. This may enable us to control how much gas evolved from the solvent is passed into different regions of the beverage.

There may be filter means in the flow path for evolved gas, from the solvent to the beverage. The filter means may filter out solvent and allow only gas to pass. The filter means may filter out some or all of a component of the evolved gases, and/or some or a component of solvent that is evolved/contacted with the gases. It would almost certainly be undesirable to allow methylal to enter the beverage.

FIG. 5 shows a metal can 670 having a cooling insert 674 comprising a removable cartridge 690 provided with actuation means 691. The cartridge 690 has a methylal/water solvent 692 (e.g. 80% methylal/20% water, by weight) with a $CO_2/N_2$ gas mixture dissolved in it.

A trap 692 of activated charcoal is provided associated with the cartridge. When the pressure in the solvent chamber is released by the user pressing/manipulating the actuation means 691 $CO_2/N_2$ is evolved and leaves the body of solvent and enters peripheral passageways 693, and then progresses on to downwardly extending passageways 694. The gas then passes back up upwardly extending peripheral passageways 695 and enters the adsorbent material 692 where it is adsorbed, Adsorbing the gas means that we do not release it to atmosphere, and the partial pressure of gas above the body of solvent is kept relatively low. Indeed, adsorbing the gas may be a way of reducing the pressure above the body of solvent to below atmospheric pressure, thereby assisting in the evaporation of the solvent itself (to be adsorbed) and/or further de-gassing of the solvent.

The can of FIG. 5 is adapted to be returned to us for recycling. We remove the cartridge 690 and replace the adsorbent material 692 (which may be provided in its own cartridge form). We also re-charge the solvent chamber of the cartridge with methylal/water (or some other solvent) with dissolved gas and pressurise it, and seal the cartridge, providing new actuation means if necessary, or re-setting the old actuating means.

The solvent cartridge may be replaced/recycled whilst leaving the adsorbent material unchanged (which may be good/for a plurality of re-uses).

The beverage chamber may be re-fillable and re-sealable.

We may extract spent solvent from the solvent chamber prior to re-filling. We may re-use the shell of the can, or it may be scrapped/sent for scrap re-cycling. If we have the used cans returned to us we can control their disposal/recycling. As an incentive to return the cans/containers we may have a refund of part of the purchase price, or discount off the next full container. The containers may include competition/prize-winning means indicative of winning a possible prize, such means preferably only being evaluatable at a recycling station to see if the possible prize has actually been won.

The high pressure solvent chamber is likely to be most usefully re-used since it may be relatively expensive to make something capable of holding the pressures we envisage using.

FIG. 6 shows a container, e.g. can, where evolved gas passes down channels 700, back up channels 701, and to vent chamber 702. The evolved gas is not released to atmosphere. Chamber 702, with its evolved cold gas, assists in cooling the beverage.

In the embodiment shown the cans may have a central blind bore at their base into which the cooling cartridge is inserted. The cartridge and bore are typically cylindrical.

Figure 7A:
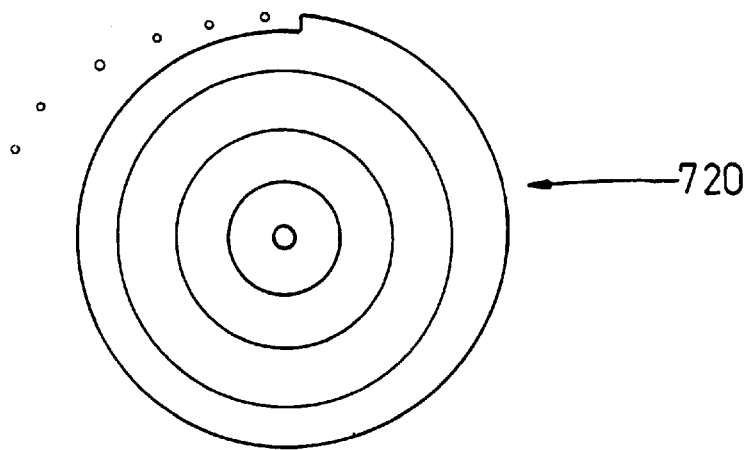
FIG. 7A and 7B shows a further cooling insert.
Figure 7B:
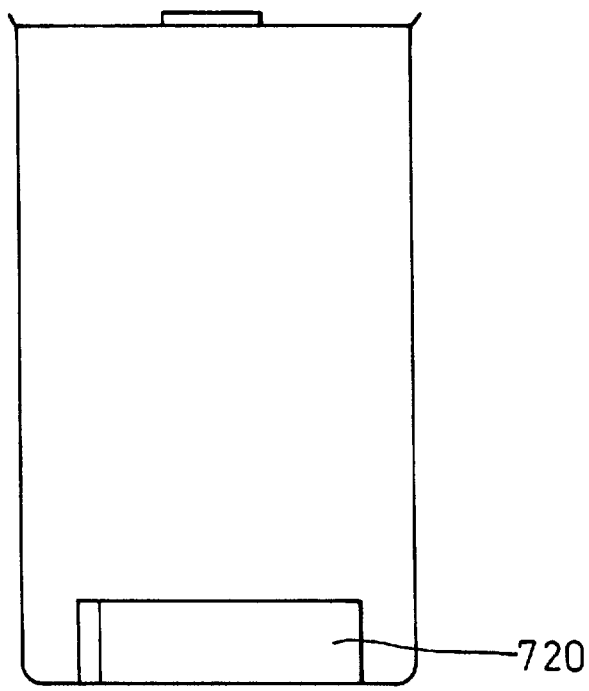

FIGS. 7A and 7B show a plan view of a cooling insert 720 which is flatter than those shown previously and which has the evolved gas move in a circular or spiral path at an upper surface (possibly ribbed for heat transfer). The gas is evolved tangentially. The diameter of the insert of FIG. 7 is about ½ to ¾ that of the can/container in which it is placed. The insert 720 is a combined cooling device and head-generating widget.

Separate actuation means may be provided for the cooling devices shown, or they may be self-actuated when the beverage chamber of a can is opened (e.g. actuated by the pressure drop in the beverage chamber).

To put the present invention into context, we would need about 33 g of liquid nitrogen to cool 330 ml of beverage by 10° C. (most beverages are basically water, and have similar heat capacities). We would need about 900 g of compressed nitrogen at room temperature, compressed to 200 bar. We would need about 225 g of compressed $CO_2$ at room temperature, compressed to 60 bar.

Pressures of 60 bar and above are likely to be impractical.

Once we thought to look for cooling effects associated with de-pressurising a liquid so that gas comes out of solution we looked at standard soft drinks (e.g. plastics PET bottles of sparkling water and cola available in supermarkets) and noted that when they are opened there is a temperature drop of the order of 1° C. or 2° C.—not large, but a drop is present. The amount of $CO_2$ dissolved in a typical soft drink is about 3 vols/vol, or about 6 g/liter. Since water is 1000 g/liter, this is about 0.6% by mass—much, much, less than the 10% or 20% by mass $CO_2$ in methylal that we aim for.

For the avoidance of doubt, we also seek protection for a can or other container part-way through production that has no beverage in it, but does have an insert adapted to receive the solvent. We also seek protection for an insert which contains solvent and gas (e.g. methylal and $CO_2$) pressurised and adapted to be incorporated in a beverage container.

Our foodstuffs beyond beverages to which the present invention is applicable include yoghurts and ice cream.

Although the cooling mechanism described has been provided as an insert, it could be integrally provided with the can or other container, or provided in some other non-insert way. We also seek protection for such non-insert containers (filled with beverage or food, or unfilled, and loaded with solvent and dissolved gas or unloaded).

The present invention although applicable to the field of beverages and foodstuffs in general will be described here with reference to the field of canned carbonated beverages. Such as beer, lager, ale, stout, porter, and the like.

Figure 8:
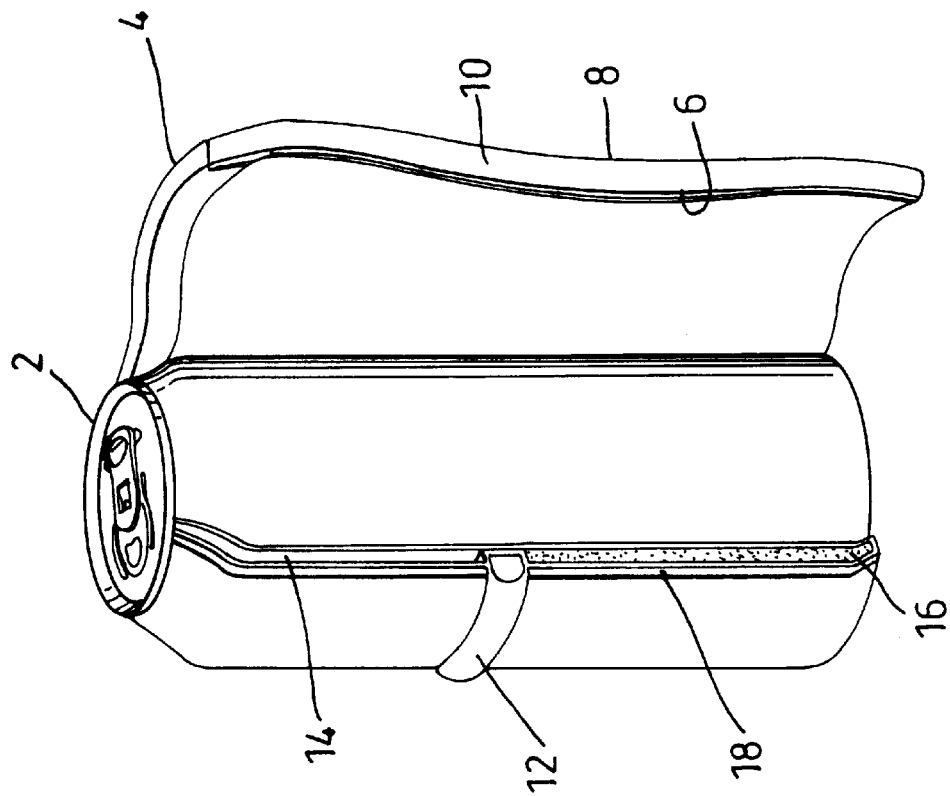
FIG. 8 shows a schematic diagram of a beverage of foodstuff container with a self cooling jacket according to the present invention.
Figure 9:
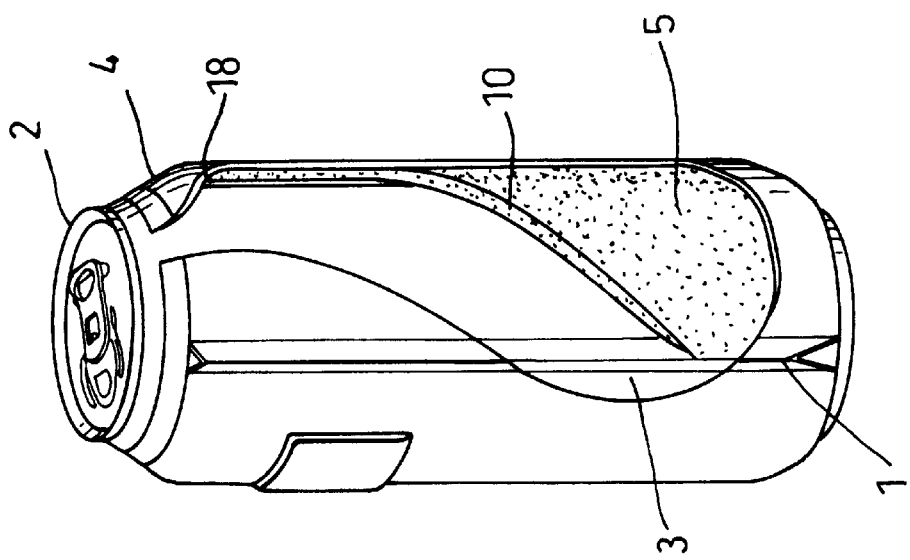
FIG. 9 shows a schematic diagram of the beverage container of FIG. 1 showing the jacket in section.

The beverage can is well known. FIGS. 8 and 9 show a standard 330 ml beverage can 2 around which a cooling means comprising a jacket 4 has been provided.

The jacket 4 comprises and inner wall 6 and an outer wall 8 between which a fluid or powder containing space 10 is provided. In FIG. 1 a vertical breakable or deformable barrier 1 is provided which separates a quantity of water 3 from a quantity of ammonium nitrate 5.

In FIG. 9 at approximately a mid point of the can there is provided an annular bag 12 which is inflated with air (or contains air) and which divides the fluid and powder containing space 10 into an upper portion 14 and a lower portion 16.

The lower portion 16 of the fluid or powder containing space contains ammonium nitrate powder and the upper portion 14 contains water. The ammonium nitrate and the water are prevented from mixing the inflated bag 12 between the two portions 14, 16.

In both of the embodiments there is provided a layer of insulation 18 outside the outer wall 8 which helps to thermally isolate the can from its surroundings.

In use, a user would press the inflated bag 12 causing it to rupture or similarly break the barrier 1 and consequently allow the contents of the upper 14 and lower 16 portions of the fluid or powder containing space 10 (or the water 3 and ammonium nitrate 5 of FIG. 1) to mix. An endothermic reaction occurs as the water and ammonium nitrate contact each other. The insulating layer 18 prevents heat being absorbed from the outside of the can and therefore the heat required by the endothermic reaction is absorbed from the contents of the can. The beverage is therefore chilled.

The advantages of a cooling sleeve are that it can be used with a standard drinks can.

Figure 10:
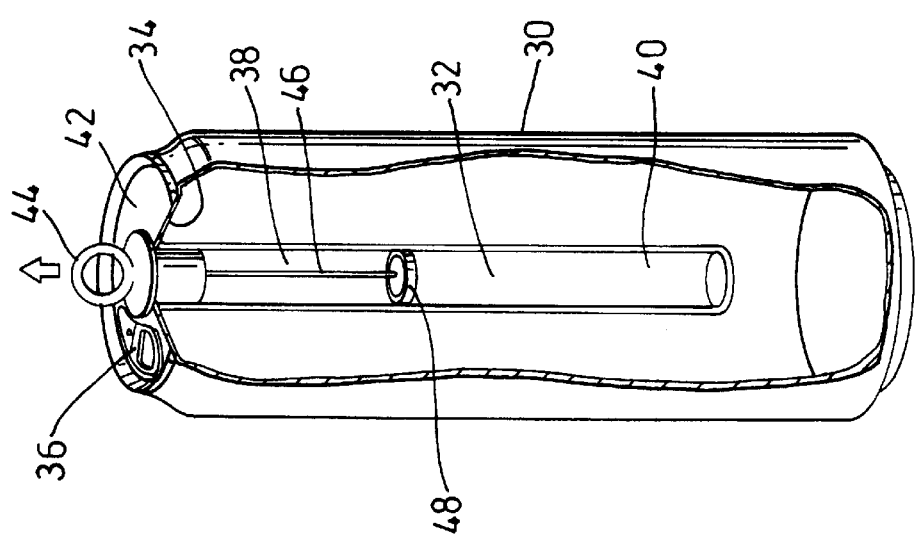
FIG. 10 shows a schematic diagram of a beverage of foodstuff container according to the present invention with a chamber containing the cooling means and a plunger activation means.

The can 30 shown in FIG. 10 has a cylindrical chamber 32 depending from the inside of an upper surface 34. It will be noted that the standard ring pull arrangement 36 has been moved to accommodate this.

There is an upper portion 38 and a lower portion 40 of the chamber 32 each of which contains one of two chemicals necessary to perform an endothermic dissolution reaction. In this embodiment the upper portion 38 contains water and the lower portion 40 contains ammonium nitrate.

On the outside top surface portion 42 of the can a ring 44 is provided which is connected via a rod 46 to a frangible membrane 48. A line of weakness is provided around a perimeter portion of the membrane 48. The skilled person will realise that the perimeter portion may include a line of weakness around a circumference of the membrane 48.

In use, to chill the beverage contained in the can a user pulls the ring 44. This force is transmitted along the rod 46 to the membrane 48. Once the force exceeds the failure strength of the line of weakness the membrane fails allowing the two chemicals to mix. This allows the endothermic reaction proceed.

Because the chamber 32 is contained within the can 30 the heat necessary to maintain the dissolution process is taken from the beverage contained in the can 30 and the beverage is consequently cooled.

Figure 11:
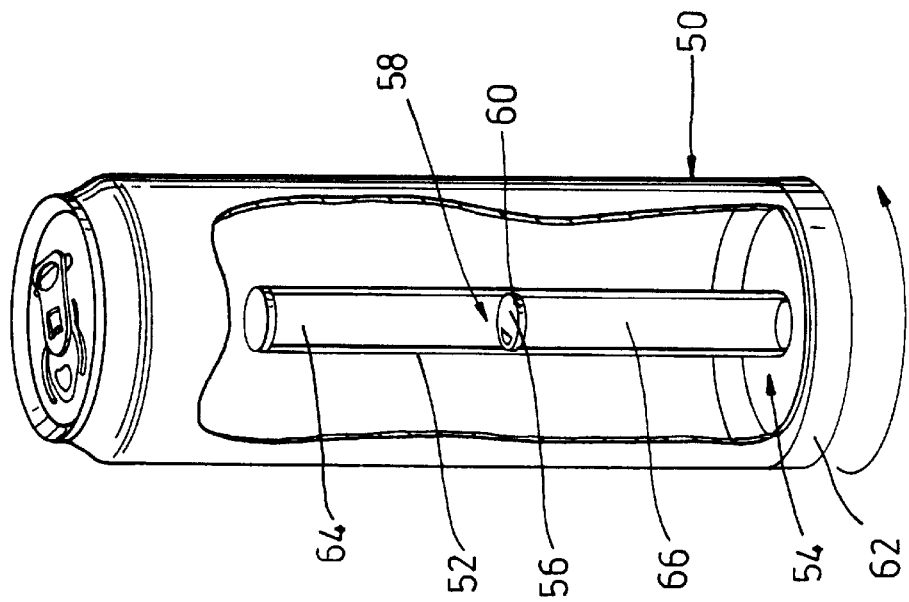
FIG. 11 shows a schematic diagram of a beverage of foodstuff container according to the present invention with a chamber containing the cooling means and a rotatable knife activation means.

FIG. 11 shows an embodiment wherein a can 50 has a cylindrical chamber 52 supported from a bottom end face portion 54. Unlike the embodiment shown in FIG. 10 this allows a standard ring pull to be used. Of course, the skilled person will realise that in the embodiment shown in FIG. 10 the central cylinder 32 could also be made to be supported by a bottom end face portion of the can 30.

The cylindrical chamber 52 like that shown in FIG. 10 is divided into two portions by a membrane 56 at a central portion 58. However, unlike the membrane 48 of FIG. 10, there is not frangible portion but the membrane 56 is fabricated from a material which is readily cut by a knife 60 which is connected to an twistable activation means 62 external of the can 50 comprising a disc on the outside of the bottom end face portion 54.

A top portion 64 of the cylindrical chamber 52 contains one of the two chemicals required to perform an endothermic dissolution reaction and a bottom portion 66 contains the other of the two chemicals.

In use, when a user wishes to chill the beverage within the can 50 then they twist the activation means 62 thus rupturing the membrane 56 with the knife 60. This rupturing allows the two chemicals held within the top and bottom portion 64, 66 to mix and thus the endothermic dissolution process can begin. The heat input required to allow the process to proceed is taken from the beverage surrounding the cylindrical chamber 52 thus cooling the beverage.

In FIGS. 12 and 13 there is also a cylindrical chamber 70 supported by a bottom end face portion 71 of a can 72. However, unlike the embodiments shown in FIGS. 10 and 11 there is no membrane dividing the cylindrical chamber 70 into two portions. In this embodiment a membrane is provided by a bag means 74 which contains a quantity of water. A quantity of ammonium nitrate 76 is provided surrounding the bag means within the cylindrical chamber. The bag means 74 ensures that the two chemicals do not mix.

A disc like member 78 is attached to an outer face of the bottom end face portion 71 of the can 70. Depending from the inner face of the disc member 78 is a rod 80 which has a screw portion 82 at the opposite end portion from the disc member which contacts the bag means 74. At a mid portion 84 of the cylindrical chamber 70 there is provided a support means 85 comprising a disc within the cylindrical chamber 70 which has an opening 86 at a central portion through which the rod 80 passes. On a lower face of the support means 85 there is provided a seal 88 comprising an annular ring of resilient material sealing the opening through the support member 85.

It will be noticed that the ammonium nitrate 76 is below the support member 85 and that the water within the bag means 74 is above. Therefore should the bag means 74 be ruptured inadvertently the two chemicals would not mix freely. It will be realised that the support member 85 is sealed to the inner surfaces of the outer walls of the cylindrical chamber 70.

Vanes 90 depend from the rod 80 at substantially a right angle from the rod 80.

In use, a user twists the disc member 78 which acts as an activation means. This twisting motion rotates the screw portion 82 of the rod 80 so that it acts upon the bag means 74. The action of the screw portion 82 draws the bag means 74 toward the support means 85 and this action eventually ruptures the bag means 74 causing release of the water. Also as the bag means 74 is drawn through the support means 85 the seal 88 ruptures thus freely connecting either side. The water and ammonium nitrate mix starting the endothermic dissolution process and thus cooling the beverage contained within the can 72.

The user can continue to rotate the disc member 78 which causes the vanes 90 to agitate the water and ammonium nitrate mixture ensuring that they mix well thus increasing the rate of the dissolution process. This increased rate in turn increases the speed at which the beverage within the can is cooled.

Figure 14:
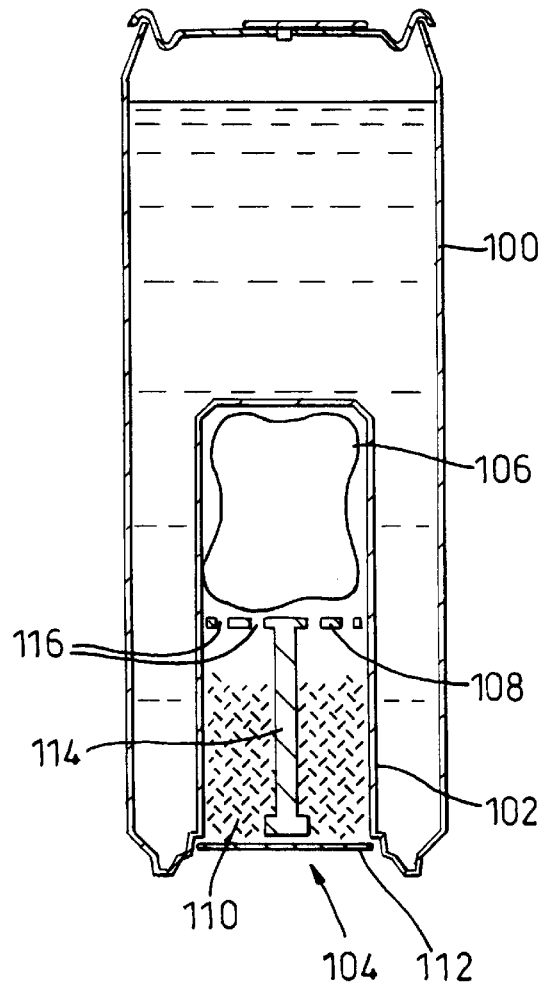
FIG. 14 shows a schematic diagram of a beverage of foodstuff container with a cooling means according to the present invention with a plunger agitation means and a push button activation means.
Figure 15:
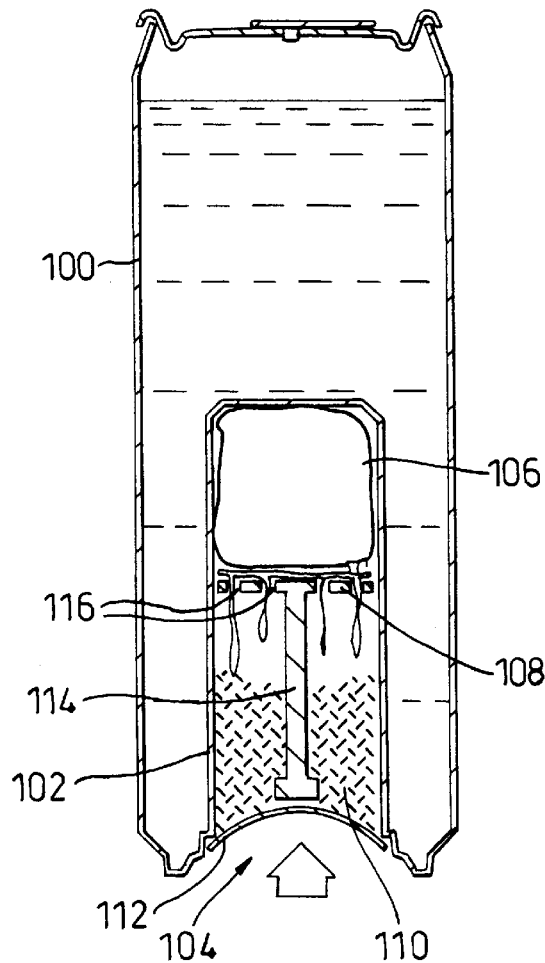
FIG. 15 shows the container of FIG. 14 with the cooling means in the activated condition.

A can 100 with a cylindrical chamber 102 depending from an inner face of a lower end portion 104 is shown in FIGS. 14 and 15. As with the embodiment shown in FIGS. 12 and 13 a quantity of water is contained within a membrane comprising a bag means 106 which is positioned in an upper portion of the cylindrical chamber 102 above a plunger 108. Below the plunger is a quantity of ammonium nitrate 110.

The bottom end face of the cylindrical chamber 102 is sealed by an activation means comprising a diaphragm 112. The plunger 108 is connected to the diaphragm 112 by a rod 114. Within the plunger 108 there are a number of openings 116 which allows matter (for instance the water and ammonium nitrate) to pass across the plunger 108.

To activate the cooling mechanism a user presses the diaphragm (activation means) 112 which causes a plunger 108 to move axially along the cylindrical chamber 102 compressing the bag means 106. The pressure exerted by the plunger 108 causes the bag means 106 to burst thus releasing the water contained therein. The water is free to pass across the plunger 108 by passing through the openings 116 (the openings can be thought of turbulence inducing means in the agitation means) and to mix with the ammonium nitrate 110. This of course starts the endothermic dissolution process which cools the contents of the can 100.

To increase the rate at which the dissolution process proceeds the user can repeatedly press the diaphragm 112. This has the effect of causing the plunger 108 to repeatedly move and thus act as an agitation means stirring the contents of the cylindrical chamber 102.

In the embodiment shown in FIGS. 16 and 17 there is again a can 150 and a cylindrical chamber 152 depending from a lower portion of the can 150. However, in this embodiment within the chamber 152 there is provided a wall member 154 formed from a resilient material. The wall member 154 comprises a cylindrical portion 156 and a bulb like portion 158. The upper end most portion of the cylindrical portion 156 of the wall member 154 is sealing connected to the inner surface an end face of the cylindrical chamber 152.

Although the cylindrical portion 156 and the bulb portion 158 are molded as one initially they are separated by a membrane 160. The bulb portion 158 contains a quantity of water and the cylindrical portion 156 contains a quantity of ammonium nitrate. The membrane 160 prevents the water and the ammonium nitrate from mixing.

To operate the cooling means a user presses the bulb portion 158 of the wall member 154. The increase in pressure caused by this pressing caused the water to rupture the membrane 160 and therefore allows the water to mix with the ammonium nitrate. As with the previous embodiments this causes an endothermic reaction which draws heat from the beverage contained in the can. The speed of the reaction can be increased by the user repeatedly pressing/ squeezing the bulb which agitates the water/ammonium nitrate mixture.

Figure 17:
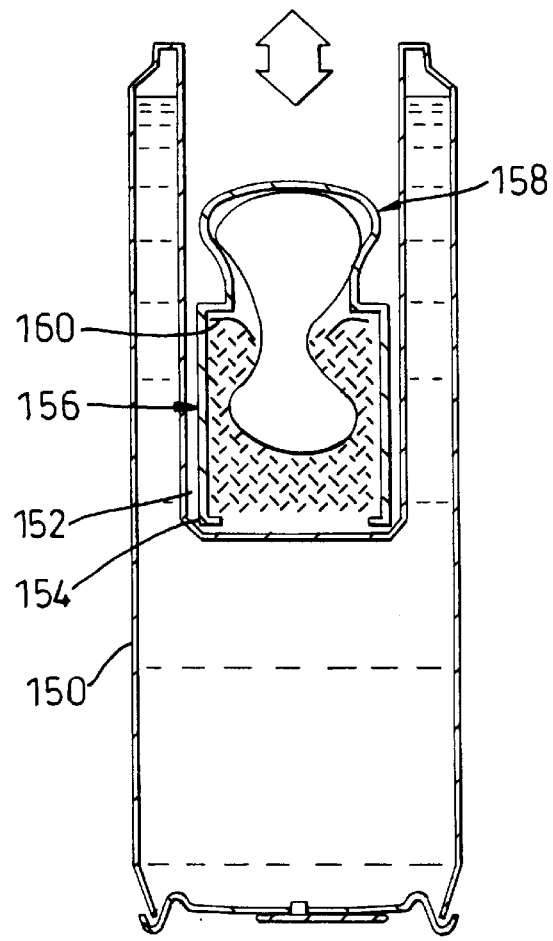
FIG. 17 shows the container of FIG. 16 with the cooling means in the activated condition.

FIGS. 17 and 18 show a mechanism containing a rack and pawl mechanism having an inner member 196 and an outer member 198. Again there is a can 200 with a cylindrical chamber 202 dependent from a lower portion of the can 200. Two support structures 204, 206 are provided from the walls of the cylindrical member 202 which guide the rack and pawl mechanism. Looking at the Figures a membrane, or/bag means 208, containing a quantity of water, is provided above the uppermost support member 204.

A diaphragm, or activation means, 210 is provided on a bottom end face 212 of the can 200 which engages the inner member 196 of the rack and pawl mechanism.

A quantity of ammonium nitrate 214 is provided between the two support members 204, 206 which is kept separated from the water by the bag means 208.

In use, a user repeatedly presses the diaphragm 210 to activate the cooling means. This forces an upward motion of the rack and pawl mechanism, one way barbs on the inner member 196 cause the outer member to also move in an upwards direction. However, friction of the outer member 198 prevents it from readily moving in a downwards direction. The inner member 196 moves down and the one way barbs cause a relative displacement between the inner and outer members 196, 198.

This relative displacement moves the outer member 198 away from the lower portion of the can 200 and towards the bag means 208. Eventually the bag means 208 bursts releasing the water therein which mixes with the ammonium nitrate and starts the endothermic dissolution process which cools the beverage within the can 200.

Further movement of the diaphragm 210 causes the outer member 198 to continue to move in an upwards motion and ensure that the water is effectively squeezed from the bag means 208 by squeezing the bag means against the cylindrical container.

Figure 20:
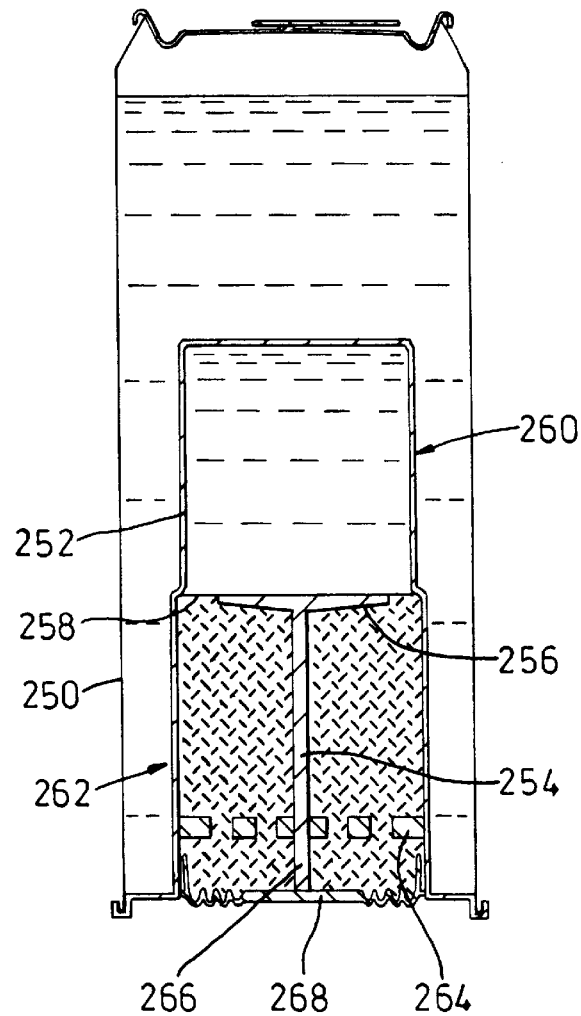
FIG. 20 shows a schematic diagram of a beverage of foodstuff container with a cooling means according to the present invention with a push button activation means and a plunger agitation means associated with a membrane means.
Figure 21:
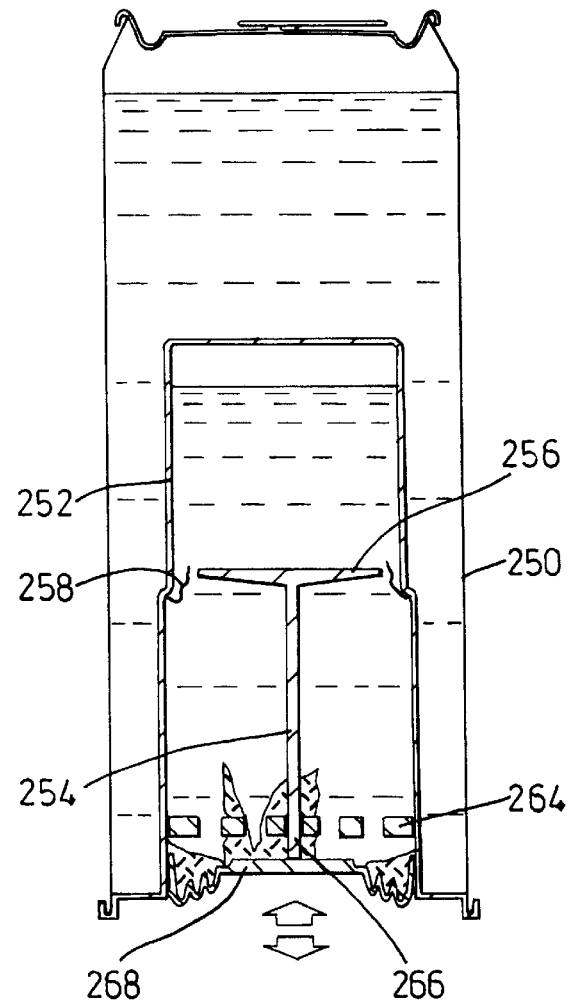
FIG. 21 shows the container of FIG. 20 with the cooling means in the activated condition.

FIGS. 20 and 21 also have a can 250 and a cylindrical member 252 dependent from a lower portion of the can 250. There is provided a piston 254 within the cylindrical chamber 252. A disc portion 256 is at a central region of the cylindrical chamber 252. The disc portion 256 is of such a diameter that a narrow annular membrane 258 is provided from the disc portion 256 to the wall of the cylindrical chamber 252.

The combination of the disc portion 256 and the annular membrane 258 effectively split the cylindrical chamber into an upper 260 and a lower portion 262. The upper portion 260 contains water and the lower portion 262 contains ammonium nitrate.

A support means 264 a disc with an opening at an central portion receiving a rod 266 of the piston 254 is provided in a lower region of the can 250. A diaphragm 268 (or activation means) is provided on the lower most end portion of the circular chamber 252 and acts upon the rod 266.

In use, a user presses the diaphragm 268. This pressure is passed through the rod 266 to the disc portion 256 causing the annular membrane 258 to rupture. Such rupture allows the water and the ammonium nitrate to mix starting the endothermic dissolution process which cools the contents of the can 200.

The user repeatedly presses the diaphragm which moves the piston 254 imparting turbulence into the water and ammonium nitrate mixture. This turbulence increases the rate at which the reaction proceeds and cools the can faster. The piston 254 is now acting as an agitation means.

The embodiment of FIGS. 22 and 23 is similar to that of FIGS. 20 and 21 with some additions and therefore like reference numerals have been used. There is no support means provided. However, there is an extra, dedicated, agitation means 270 provided which effectively comprises a second rod 272 (effectively an extension of the first rod 266) with a second disc member 274 connected to an end most portion.

As the skilled person will realise the ammonium nitrate and the water have been provided in the opposite portion to that in FIGS. 22 and 23. That is the ammonium nitrate is provided in the upper portion 260 and the water is provided in the lower portion 262.

The cooling means is activated in a similar way to the embodiment shown in FIGS. 20 and 21 but the dedicated agitation means ensures that the water and ammonium nitrate are more effectively mixed.

Figure 16:
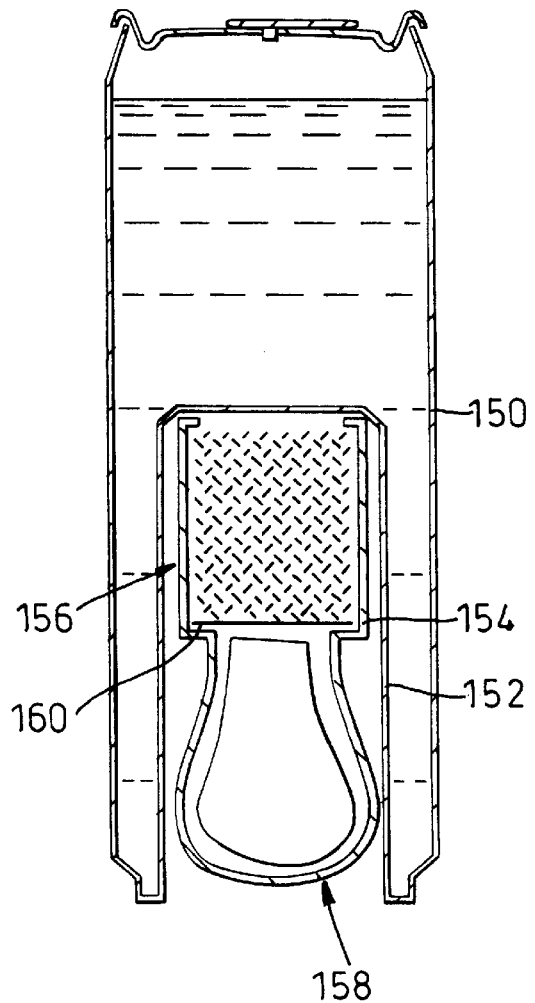
FIG. 16 shows a schematic diagram of a beverage of foodstuff container with a cooling means according to the present invention with a bellows activation and agitation means.
Figure 24:
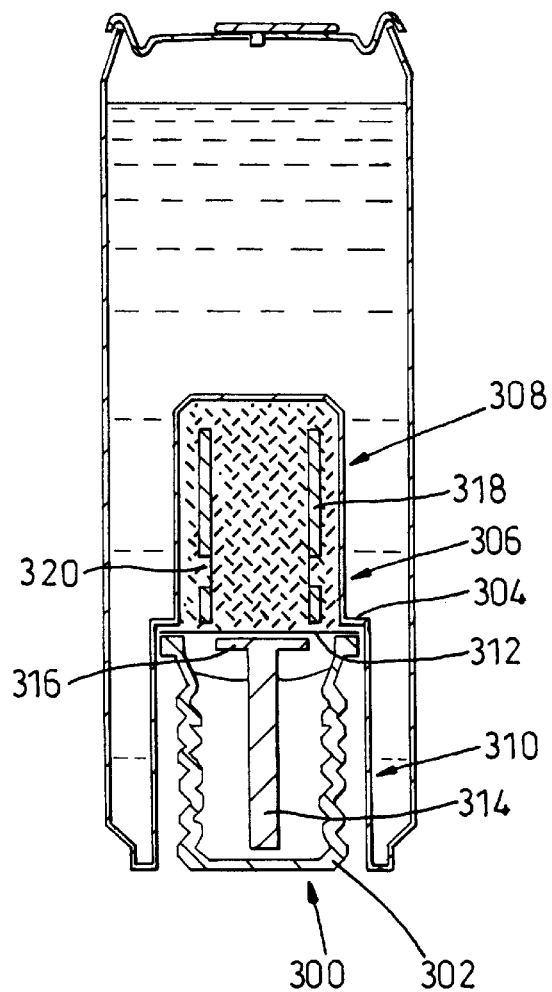
FIG. 24 shows a schematic diagram of a beverage of foodstuff container with a cooling means according to the present invention with a bellows activation and agitation means together with a plunger agitation means.
Figure 25:
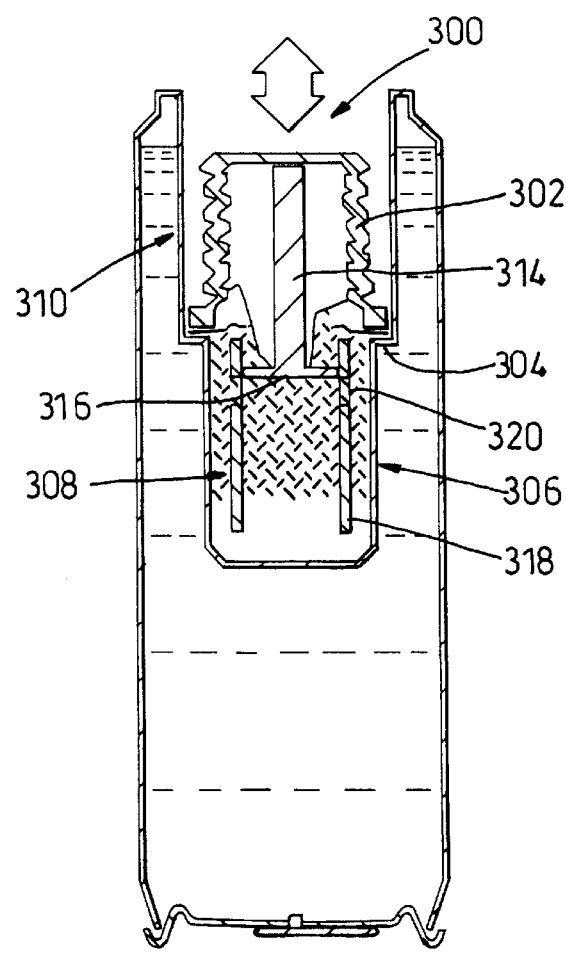
FIG. 25 shows the container of FIG. 24 with the cooling means in the activated condition.

The embodiment shown in FIGS. 24 and 25 is similar to that shown in FIGS. 16 and 17 in that a bellows means 300 is provided. However, in this particular embodiment the bellows comprises a cylindrical walled vessel 302 in which the walls have been corrugated so that they are readily compressible. The upper most portions of the cylindrical walled vessel 302 are attached to a step 304 in the wall of a cylindrical chamber 306.

As with previous embodiments the cylindrical chamber 306 is divided into an upper portion 308 and a lower portion 310 separated by a membrane 312. In this embodiment ammonium nitrate is contained within the upper portion and water is contained within the bottom portion.

Within the bellows 300 there is provided a piston means 314 which in the un-activated state of the cooling means is interposed between a bottom face of the bellows 300 and the membrane 312 with a disc portion 316 of the piston resting against the membrane 312.

Within the upper portion 308 of the cylindrical chamber 306 there is disposed an annular wall 318 of such dimensions that the opening is of such dimensions that it can slidably receive the disc portion 316 of the piston 314. In the wall of the annular wall 318 there are provided openings 320 (the openings may be thought of as turbulence inducing means in a wall member which is in a fixed relationship to the cooling chamber) connecting the inside of the annular wall 318 to the outside.

In use, as with the embodiment shown in FIGS. 16 and 17 the user presses the bellows to activate the cooling means. However, in this embodiment this does not only cause an increase in pressure within the water but also causes the piston 314 to rupture the membrane 312 thus allowing the water and the ammonium nitrate to mix.

As the piston 314 moves within slides within the annular wall 318 matter is expelled through the openings 320. This adds to mixing of the ammonium nitrate and water again increasing the rate at which the contents of the can are cooled.

Figure 26:
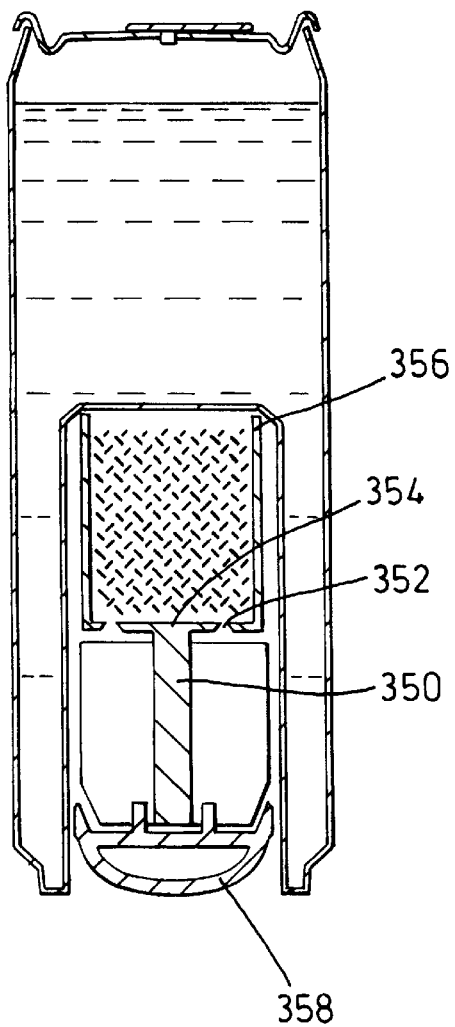
FIG. 26 shows a schematic diagram of a beverage of foodstuff container with a cooling means according to the present invention with a plunger activation and agitation means.
Figure 27:
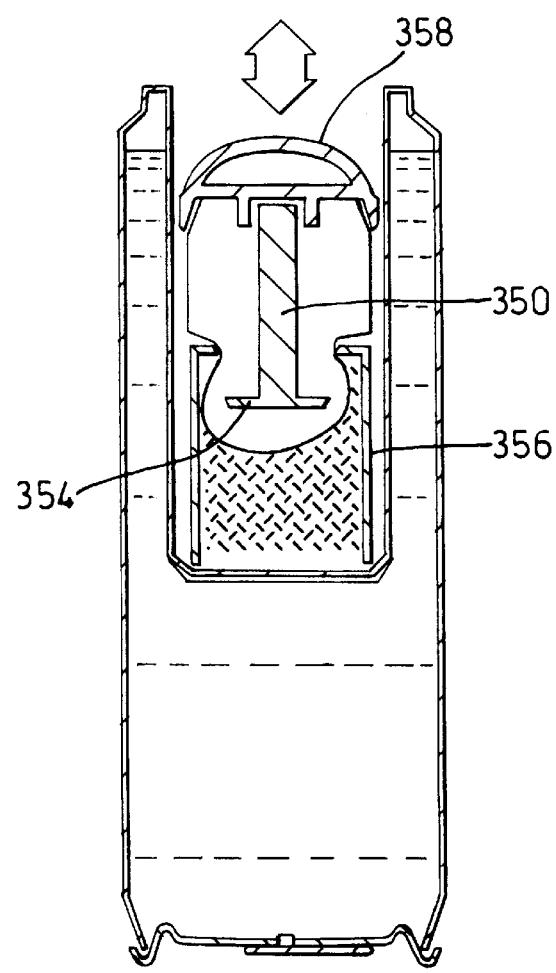
FIG. 27 shows the container of FIG. 26 with the cooling means in the activated condition.

In the embodiment shown in FIGS. 26 and 27 a piston 350 is provided connected via a frangible joint 352 connecting a disc portion 354 of the piston 350 to a container means 356. The ammonium nitrate is contained within the container means 356 and prevented from mixing with a quantity of water by the frangible joint.

A handle 358, activation means, which may be folded flat, is attached to a bottom end portion of the piston 350.

In use, a user would unfold the handle 358 and pull or push it, thus moving the piston 350 breaking the frangible joint 352 causing the water and ammonium nitrate to mix. The user may continue to move the piston by use of the handle and cause the piston 350 to act as an agitation means mixing the ammonium nitrate and water.

The skilled person will realise that many of the features in the embodiments so far described are applicable to other embodiments. For example the foldable handle 358 of FIGS. 26 and 27 could be used on any of the other embodiments. Another example of a transferable feature would be the piston and frangible joint arrangement also of FIGS. 26 and 27 which could equally well be applied to other embodiments. The skilled person will realise other such features within the embodiments shown.

The embodiment shown in FIGS. 28 and 29 is somewhat different to those shown in the previous embodiments; there is no activation means external to the can.

Again a cylindrical chamber 400 is provided depending from a lower end portion of the can 402. There is no opening through the can 402 and the chamber 400 can be provided in a standard can. Within the cylindrical chamber 400 there is provided a sub-container 404 which has an opening 406 at a first end closed by a soluble seal.

Within the sub-container there is a quantity of ammonium nitrate and within the chamber 400, partially surrounding the sub-container there is a quantity of water. It will be noted that when the can is upright (i.e. FIG. 28) there is a portion of the chamber 408 which does not contain any water which ensures that no water contacts the soluble seal.

To operate the cooling mechanism a user inverts the can 402 (as shown in FIG. 29) which allows the water to contact the soluble seal and dissolve or rupture the seal. The water and ammonium nitrate are then free to mix and the cooling endothermic reaction can proceed.

Figure 30:
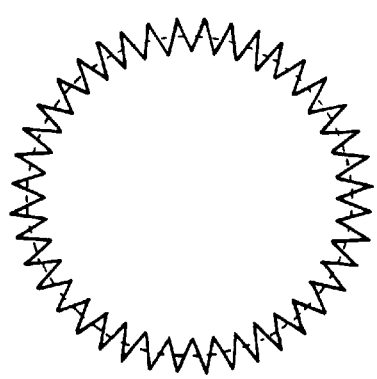
FIG. 30 shows a plan view of a heat transfer means.
Figure 31:
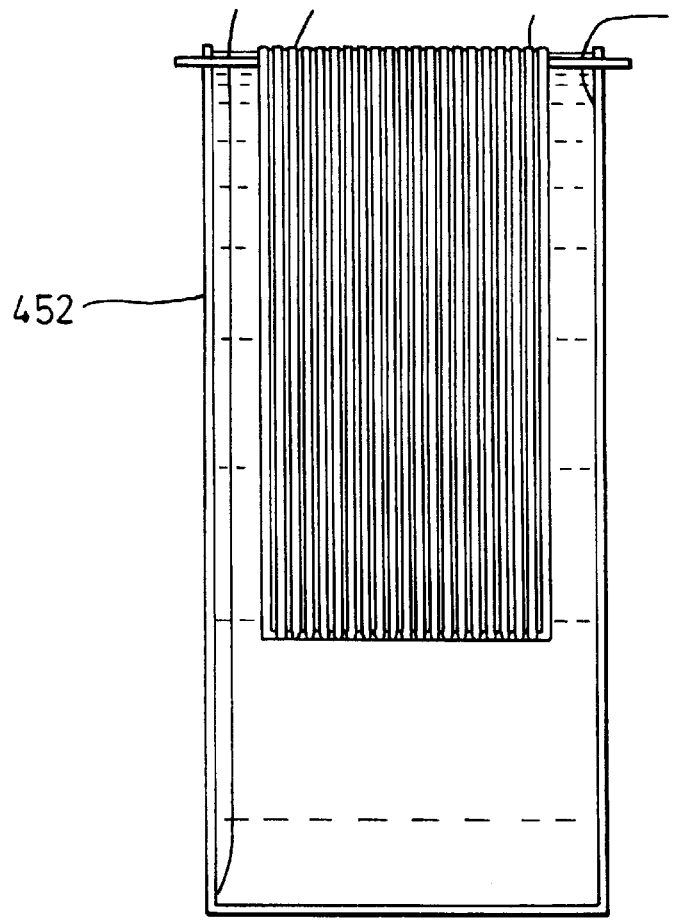
FIG. 31 shows a schematic diagram of a beverage of foodstuff container with a cooling means according to the present invention in which there is provided the heat transfer means of FIG. 30.

The walls of any of the cylindrical chambers of the previous embodiments could be provided as corrugated cylinders (or heat transfer means) as shown in plan view in FIG. 30. A cross section of a can 452 with such a cylinder in place is shown schematically in FIG. 24.

FIGS. 32 to 39 show an embodiments which again do not have an internal activation means and so can be used in a standard can with no modifications. A stand alone cartridge 500 is provided which is inserted in a can 502. The cartridge 500 comprises a cylindrical vessel which is sealed by a diaphragm 504.

At a central portion of the vessel a membrane 505 divides the vessel 500 into a first 506 and second 508 portion. A quantity of water is maintained in the first portion and a quantity of water is maintained in the second portion. The membrane of course ensures that the two chemicals do not mix.

Depending from the diaphragm 504 pointing toward the membrane is a diaphragm interconnection means 510 comprising two resilient fingers each with a barb member 512 at an end portion. Secured to the membrane is a membrane interconnection means 514 also comprising two resilient fingers with barb members 516 at end portions.

As shown in FIG. 32 the cartridge 500 is in an unactivated state and the barb members of the two interconnection means are not connected. The cartridge 500 is in this condition when it is inserted into the can 502.

In the next stage in the production process, the can 502 is filled with a carbonated beverage and sealed by a cap 518. Due to carbonization of the of the beverage the inside of the can 502 is now partially pressurised. Thus the diaphragm 504 has a pressure exerted upon it and is caused to move towards the membrane 505 in turn causing the two interconnection means to come into contact. This is shown in FIG. 33.

The next stage in the can production process is the pasteurisation of the can is which the can is heated. This heating causes the pressure inside the can to rise forcing the diaphragm 504 further toward the membrane 505 this in turn causes the barb members 512, 516 to pass each other. This is shown in FIG. 34.

Once pressure in the can 502 has returned to normal, as shown in FIG. 28, the interconnection means 510, 514 remain in contact due to the barb members 512, 516.

Activation of the cooling means is achieved once the can is opened, as shown in FIG. 36. Activating a ring pull 518 of the can releases the pressure within the can causing the diaphragm 504 to move to its original, uncompressed, position as in FIG. 32. Because the interconnection means are now connected the membrane 505 ruptures allowing the two chemicals within (in this case water and ammonium nitrate) to mix and the cooling process to start.

Figure 37:
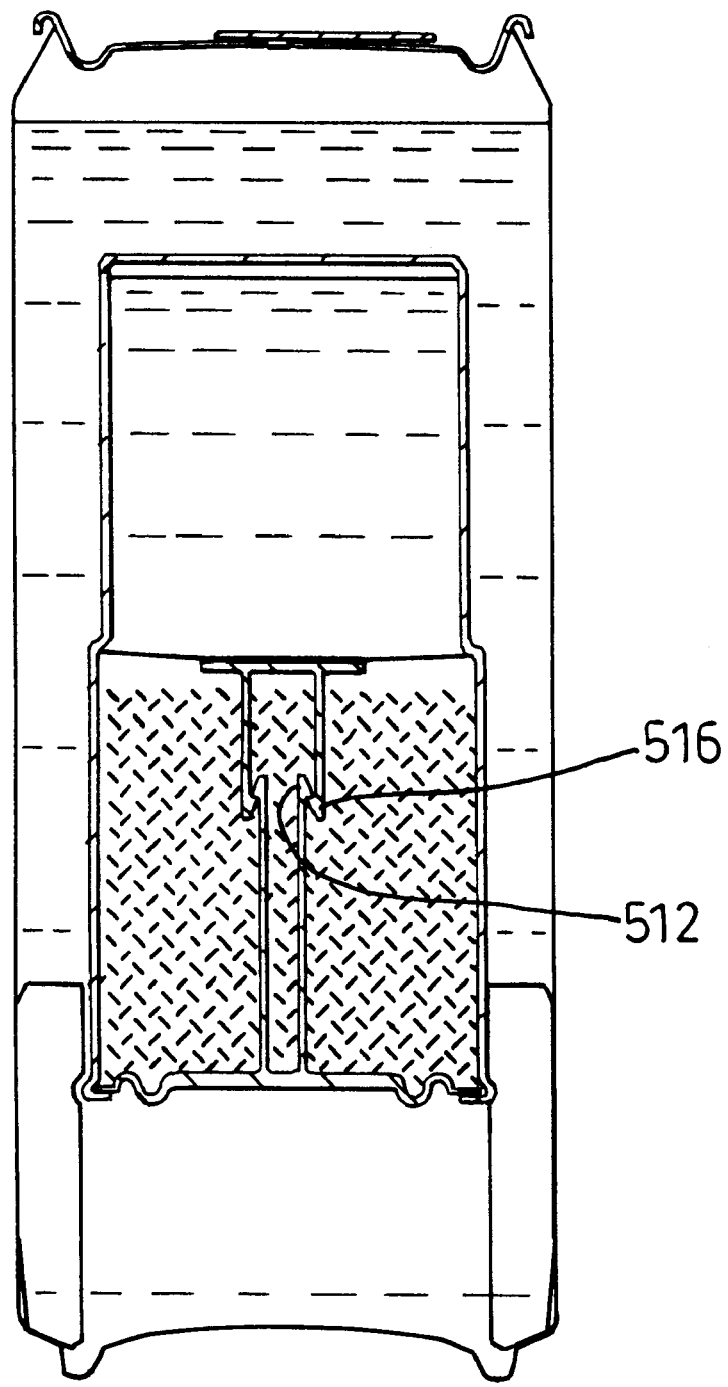
FIG. 37 shows a view of the container shown in FIGS. 32 to 36 in greater detail.

FIG. 37 is an enlarged version of FIG. 35 showing the barb means more clearly.

Figure 38:
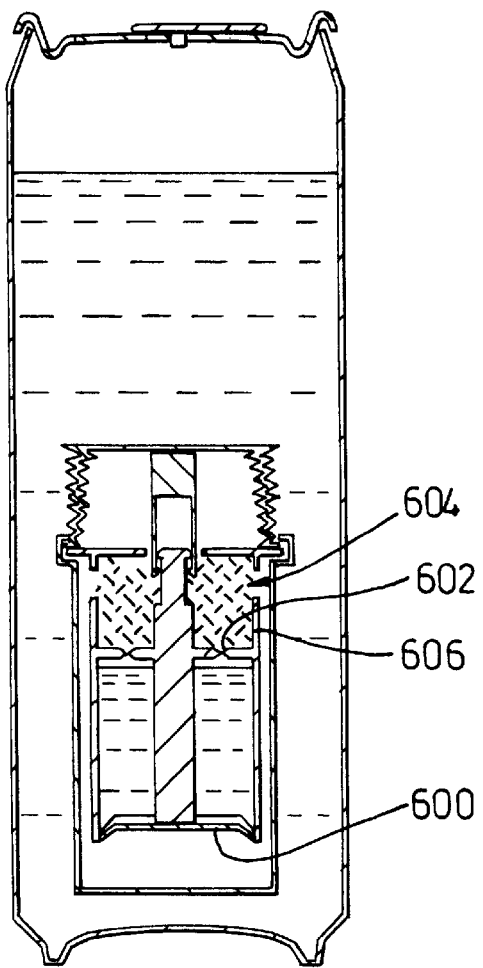
FIG. 38 shows another embodiment of a container with a cooling means according to the present invention in which there is an internal activation means.
Figure 39:
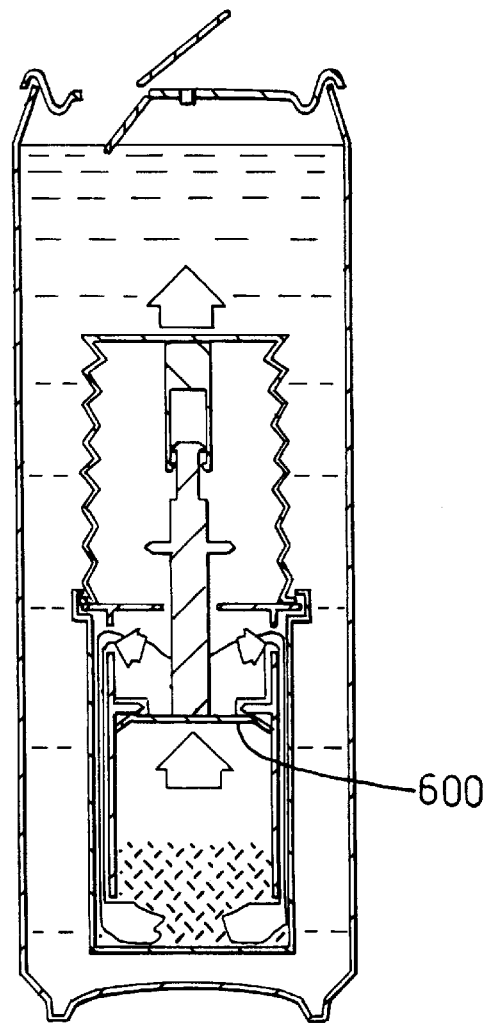
FIG. 39 shows the container of FIG. 38 in the activated condition.

FIGS. 38 and 39 also show an embodiment which is armed by the pasteurisation process. However, some of the features from the earlier embodiments have now been included. For instance a piston 600 has been provided to cause some agitation of the two chemicals as the can is opened. Also a frangible joint 602 is used to ensure that the two chemicals do not mix before activation. Openings 604 have been provided in an annular wall member 606 to provide a flow path for the water as the piston 600 moves upwards (as illustrated in FIG. 39).

In a further embodiment which is not illustrated a can is provided in which at least one pair of Peltier plates are provided. That is a plates involving the use of dissimilar metals which when a current is passed through them cause a cooling effect. (This is the thermocouple effect in reverse).

The plates may be in contact with the beverage, or foodstuff, which ensures a good thermal contact with the beverage, or foodstuff, and thus good cooling. Alternatively, the plates may be provided in a cooling chamber, the outside of which is in contact with the beverage or foodstuff.

A small battery is provided in a recess in the bottom of the can with wires connected to the plates. A small push button switch is provided on a bottom end face portion of the can and is connected in one of the wires between the positive terminal of the battery and the plates.

In use, to activate the cooling means the user presses the button. This causes a current to flow from the battery, through the plates, and thus cools the beverage. As with any of the other examples, the user leaves the can for a short while to ensure that the beverage therein is effectively cooled and can then open the can in the usual way to consume the beverage.

The skilled person will realise that many of the Figures are provided in pairs with the first drawing of each pair showing the cooling means un-activated and the second Figure showing the cooling means after activation.

What is claimed is:

1. A self-cooling beverage container comprising:
   a beverage chamber having beverage retained in it;
   a solvent chamber having pressurised solvent retained in it;
   said pressurised solvent comprising methylal;
   a pressurised gas dissolved in the pressurised solvent;
   pressurisation means adapted to hold said pressurised solvent with its dissolved gas at a pressure above atmospheric pressure;
   de-pressurisation means adapted to release said pressure in the solvent chamber;
   the arrangement being such that, in use, when said pressurised solvent chamber is de-pressurised said dissolved gas comes out of solution and expands, extracting heat from said solvent/beverage system, there being heat transfer means adapted to transfer heat from said beverage to the solvent and/or to the gas released from said solvent, the overall result being a cooling of said beverage.

2. A container according to claim 1 in which said gas comprises a gas selected from the group consisting of: carbon dioxide, nitrous oxide, and nitrogen.

3. A container according to claim 1 in which said beverage has a dissolved gas and is pressurised.

4. A container according to claim 1 in which when said gas comes out of solution there is an endothermic effect, which in use helps to cool said solvent.

5. A container according to claim 1 in which when said gas comes out of solution it expands and causes expansion cooling.

6. A container according to claim 1 in which when said gas comes out of solution bubbles rise to the surface of said solvent and small droplets of said solvent are carried into the top gas above the body of said solvent, promoting faster evaporation of said solvent.

7. A container according to claim 1 which comprises a can having a methylal-based solvent which contains about 20% dissolved $CO_2$ (20% weight of $CO_2$, 80% weight of solvent) and which has the methylal/dissolved $CO_2$ pressurised to about 7 or 8 bar.

8. A container according to claim 1 which comprises trap means adapted to prevent said gas, or at least some components of said gas, from reaching atmosphere, wherein said trap means comprises an expansion chamber adapted to receive evolved gas from said solvent.

9. A container according to claim 8 in which said trap means is initially provided at a low pressure.

10. A container according to claim 1 which comprises adsorption means adapted to hold evolved gas.

11. A container according to claim 10 in which said adsorption means both prevents said evolved gas from reaching atmosphere and reduces the pressure of said gas above the body of said solvent, thereby facilitating more evaporation of solvent/evolving of gas out of said solvent.

12. A container according to claim 10 in which said adsorption means comprises one of the compounds selected from the group consisting of: activated charcoal, a zeolite, a dessicant, and some other thing that captures at least a component of said gas.

13. A container according to claim 10 which has thermal insulation between said adsorption means and said beverage and/or exterior wall of the container.

14. A container according to claim 1 in which said solvent comprises a methylal/water mixture.

15. A container according to claim 14 adapted in use to release the dissolved gas from said solvent over a longer time than an equivalent container would release the same volume of gas dissolved in the same volume of pure methylal as is present in the methylal/water mixture.

16. A container according to claim 1 which has a cooling cartridge that is adapted to be recharged with a substance selected from the group consisting of: gas, solvent and gas-dissolved in solvent.

17. A container according to claim 1 in which said pressurised solvent and its dissolved gas is pressurised to a pressure selected from the group consisting of 2, 3, 4, 5, 6, 7 and 8 bar.

18. A foodstuff container comprising:
    a foodstuff chamber having foodstuff retained in it;
    a solvent chamber having pressurized solvent retained in it;
    said pressurized solvent comprising methylal;
    said pressurized solvent having a gas dissolved in it;
    pressurization means adapted to hold said pressurized solvent with its dissolved gas at a pressure above atmospheric pressure;
    depressurization means adapted to release said pressure in the solvent chamber; and
    the arrangement being such that, in use, when said pressurized solvent chamber is depressurized said dissolved gas comes out of solution and expands, extracting heat from said solvent/foodstuff system, there being heat transfer means adapted to transfer heat from said foodstuff to the solvent and/or to the gas released from said solvent, the overall results being a cooling of said foodstuff.

19. A container according to claim 18 in which said gas comprises a gas selected from the group consisting of: carbon dioxide, nitrous oxide, and nitrogen.

20. A container according to claim 18 in which said foodstuff has a dissolved gas and is pressurized.

21. A container according to claim 18 in which when said gas comprises a material which reacts endothermally with the foodstuff, which in use helps to cool said solvent.

22. A container according to claim 18 wherein said gas is in a pressurized state such that when said gas comes out of solution expands and thereby causes expansion cooling.

23. A container according to claim 18 wherein said gas comes out of solution as bubbles, rises to the surface of said solvent and forms small droplets of said solvent which are then disposed into the top gas above the body of said solvent, thereby promoting faster evaporation of said solvent.

24. A container according to claim 18 which comprises a can having a methylal-based solvent which contains about 20% dissolved $CO_2$ (20% weight of $CO_2$, 80% weight of solvent) and which has the methylal/dissolved $CO_2$ pressurized to about 7 or 8 bar.

25. A container according to claim 18 which comprises trap means adapted to prevent at least a portion of said gas from reaching atmosphere, wherein said trap means comprises an expansion chamber adapted to receive evolved gas from said solvent.

26. A container according to claim 25 in which said trap means is initially provided at a low pressure.

27. A container according to claim 18 which comprises adsorption means adapted to hold evolved gas.

28. A container according to claim 27 in which said adsorption means both prevents said evolved gas from reaching atmosphere and reduces the pressure of said gas above the body of said solvent, thereby facilitating more evaporation of solvent and evolving of gas out of said solvent.

29. A container according to claim 27 in which said adsorption means comprises one of the compounds selected from the group consisting of: activated charcoal, a zeolite, a desiccant, and a material which captures at least at component of said gas.

30. A container according to claim 27 which has thermal insulation between said adsorption means and at least one of said beverage wall and said exterior wall of the container.

31. A container according to claim 18 in which said solvent comprises a methylal/water mixture.

32. A container according to claim 31 wherein said solvent has a volume of dissolved gas and wherein said container includes structure means for releasing at least a portion of said volume of gas over a longer time than an equivalent container having said volume of gas dissolved in substantially pure methyl/water mixture.

33. A container according to claim 18 which includes a cooling cartridge that is recharged with a substance selected from the group consisting of: gas, solvent and gas dissolved in solvent.

34. A container according to claim 18 in which said pressurized solvent and its dissolved gas is pressurized to a pressure selected from the group consisting of 2, 3, 4, 5, 6, 7 and 8 bar.

35. A container according to claim 18 in which an agitation means is provided.

36. A container according to claim 35 in which said agitation means comprises a member adapted to move axially through said container.

37. A container according to claim 18 wherein said pressurization means is adapted to be ruptured and comprises a structure from the group consisting of a membrane, a divider, a partition, and a bag.

38. A foodstuff container comprising:

a foodstuff chamber having foodstuff retained in it;

a solvent chamber having pressurized solvent retained in it, said solvent comprising methylal;

said pressurized solvent having a gas dissolved in it;

pressurization means adapted to hold said pressurized solvent with its dissolved gas at a pressure above atmospheric pressure;

de-pressurization means adapted to release said pressure in the solvent chamber;

agitation means adapted to move axially through said container; and the arrangement being such that, in use, when said pressurized solvent chamber is depressurized said dissolved gas comes out of solution and expands, extracting heat from said solvent/foodstuff system, there being heat transfer means adapted to transfer heat from said foodstuff to the solvent and/or to the gas released from said solvent, the overall results being a cooling of said foodstuff, and the agitation means is adapted to agitate the contents of the container.

39. A container according to claim 38 in which said gas is in a pressurized state such that when said gas comes out of solution, expands and thereby causes expansion cooling.

40. A container according to claim 38 which comprises adsorption means adapted to hold evolved gas.

41. A container according to claim 40 in which said adsorption means comprises one of the compounds selected from the group consisting of: activated charcoal, a zeolite, a desiccant, and a material which captures at least a component of said gas.

42. A container according to claim 38 which comprises trap means adapted to prevent at least a portion of said gas from reaching atmosphere, wherein said trap means comprises an expansion chamber adapted to receive evolved gas from said solvent.

43. A container according to claim 38 in which said gas comprises a gas selected from the group consisting of carbon dioxide, nitrous oxide, and nitrogen.

* * * * *